United States Patent
Etemadi et al.

(10) Patent No.: US 12,505,917 B1
(45) Date of Patent: Dec. 23, 2025

(54) ASSESSMENT OF CLINICAL EVALUATIONS FROM MACHINE LEARNING SYSTEMS

(71) Applicant: Northwestern Memorial Healthcare, Chicago, IL (US)

(72) Inventors: Mozziyar Etemadi, Chicago, IL (US); Galal Galal, Chicago, IL (US); Michael Thompson, Chicago, IL (US); Eric Karl, Walnut Creek, CA (US); Matthew Wittbrodt, Chicago, IL (US); Jonathan Huang, Chicago, IL (US); Caitlin Teague, Chicago, IL (US); James Alex Heller, Chicago, IL (US)

(73) Assignee: Northwestern Memorial Healthcare, Chicago, IL (US)

( * ) Notice: Subject to any disclaimer, the term of this patent is extended or adjusted under 35 U.S.C. 154(b) by 0 days.

(21) Appl. No.: 18/800,571

(22) Filed: Aug. 12, 2024

(51) Int. Cl.
G16H 30/40 (2018.01)
G06V 10/75 (2022.01)
G16H 50/20 (2018.01)

(52) U.S. Cl.
CPC .......... *G16H 30/40* (2018.01); *G06V 10/751* (2022.01); *G16H 50/20* (2018.01)

(58) Field of Classification Search
CPC ......... G06T 2207/20084; G06T 7/0012; G06T 2207/10056; G06T 2207/30096; G06T 2207/20081; G06T 2207/30024; G06T 2207/20021; G06T 7/10; G06T 2210/41; G06N 3/045; G06N 3/08; G06N 20/00; G06N 5/04; G06N 3/0464; G06V 2201/03; G06V 10/82; G06V 20/698; G06V 20/695; G06V 30/19173; G06V 10/26; G06V 10/806; G06V 10/25; G06V 10/751;
(Continued)

(56) References Cited

U.S. PATENT DOCUMENTS 8,331,730 B2 * 12/2012 Jessen ................ G06V 10/7515
382/286
9,122,960 B2 * 9/2015 Lin ........................... G06T 5/00
(Continued)

FOREIGN PATENT DOCUMENTS

WO  2017152121 A1  9/2017

OTHER PUBLICATIONS

Ashay Arora, et al., "ISTHMUS: Secure, Scalable, Real-time and Robust maching Learning Platform for Healthcare", Parkland Center for Clinical Innovation, Sep. 29, 2019, pp. 1-12, XP081484903.
(Continued)

*Primary Examiner* — Courtney Joan Nelson
(74) *Attorney, Agent, or Firm* — Hogan Lovells US LLP

(57) ABSTRACT

Systems and methods include techniques associated with one or more machine learning systems analyze, compare, and process one or both of model outputs or model inputs. Content verification may include generating content using a first trained machine learning system and then verifying the initial generation using one or more second trained machine learning systems, such as by generating content associated with a prompt, comparing output labels, or comparing output responsive to changing parameters. Additionally, data preparation may include image scaling and batching methods to improve machine learning outputs.

13 Claims, 24 Drawing Sheets

(58) Field of Classification Search
CPC ........ G16H 30/40; G16H 50/20; G16H 30/20; G06F 2218/08
See application file for complete search history.

(56) References Cited

U.S. PATENT DOCUMENTS

| | | | |
|---|---|---|---|
| 10,452,813 | B2 | 10/2019 | Sorenson et al. |
| 10,977,796 | B2 | 4/2021 | Vincent |
| 11,238,588 | B2 | 2/2022 | Kawagishi |
| 11,244,755 | B1 | 2/2022 | Syeda-Mahmood |
| 11,893,732 | B2 * | 2/2024 | Georgescu ........... G06V 20/695 |
| 12,062,450 | B2 * | 8/2024 | Kim ....................... G06T 7/0012 |
| 2010/0099974 | A1 | 4/2010 | Desai |
| 2016/0350919 | A1 | 12/2016 | Steigauf |
| 2018/0055468 | A1 | 3/2018 | Reicher |
| 2019/0088359 | A1 | 3/2019 | Moore |
| 2020/0211692 | A1 | 7/2020 | Kalafut |
| 2020/0250336 | A1 | 8/2020 | Stockert |
| 2020/0321101 | A1 | 10/2020 | Karargyris et al. |
| 2020/0349434 | A1 | 11/2020 | Zhang |
| 2020/0372635 | A1 * | 11/2020 | Veidman ............... G06T 7/0012 |
| 2021/0098133 | A1 | 4/2021 | Chowdhy et al. |
| 2021/0216822 | A1 | 7/2021 | Palik |
| 2021/0225512 | A1 | 7/2021 | Himeno |
| 2021/0228276 | A1 | 7/2021 | Giraldez |
| 2022/0051114 | A1 | 2/2022 | Lyman |
| 2023/0274421 | A1 * | 8/2023 | Cho ....................... G16H 50/20 382/131 |
| 2023/0367806 | A1 * | 11/2023 | Kojima .................. G06V 10/82 |

OTHER PUBLICATIONS

"Second Opinion—Real-Time Pathology Detection Aid for Denists, from Dentistry's Global AI Leader", Pearl, Inc. (2021) 4 pages Second Opinion—Real-time pathology detection aid for dentists, from dentistry's global AI leader (hellopearl.com).

Radlogics, Inc.—515599—Apr. 5, 2018 | FDA—FDA Warning Letter—Apr. 5, 2018.

GE Healthcare "Marquette 12SL Algorithm Connected Clinical Excellence", General electric Company (2016), 10 pgs.

International Search Report of PCT/US2023/061179, mailed May 8, 2023.

* cited by examiner

ASSESSMENT OF CLINICAL EVALUATIONS FROM MACHINE LEARNING SYSTEMS

BACKGROUND

1. Field of Disclosure

Embodiments of the present disclosure relate to systems and methods to evaluate, validate, and/or assess one or more of a set of inputs or a set of outputs associated with one or more machine learning systems. Specifically, one or more embodiments are directed toward techniques to receive and/or adjust model outputs to validate output quality and/or to determine model weights and parameters. Additionally, one or more embodiments are directed toward adjustments to data input formats for improved output results.

2. Description of Related Art

Medical providers may perform various procedures when evaluating and/or treating an interior of a patient's body. For example, diagnostic evaluations may include one or more procedures where images (e.g., still images, frames from a video, image data captured by one or more diagnostic devices, etc.) are acquired for a patient's body. In some instances, images may be obtained by inserting a camera or using other imaging devices into the patient's body. Furthermore, image data may be acquired after removing an item from a patient's body, such as tissue, and then using one or more devices to image the sample. Additionally, diagnostic evaluations may also be performed with images obtained from an exterior of the body, for example using one or more imaging modalities including X-rays, magnetic resonance imaging (MRI), ultrasound, radiography, computed tomography (CT), mammography, fluoroscopy, positron emission tomography (PET), and/or the like. Similar tools and implementations may also be used with treatment procedures, which may also include removal of tissue, interrogating a targeted region with radiation, or other actions. When obtaining images and/or samples for diagnostic and/or treatment procedures, images and/or samples may be helpful and acquiring such images and/or samples may take various forms, including but not limited to, endoscopy in which an endoscope (e.g., a probe) is inserted into a hollow organ or cavity of a body, use of one or more imaging devices where a patient is positioned within and/or near a machine associated with a selected modality, and/or the like. In certain cases, a highly qualified practitioner may not have sufficient time to perform and/or review imaging or sample information for each patient. To assist with initial evaluation of imaging or tissue information, various machine learning and/or artificial intelligence systems may be deployed, such as segmentation models to identify regions within a body corresponding to anomalies or classifiers to identify anomalies within an image. However, models may have unacceptable error rates and/or may be limited to a specific field. Furthermore, the output of the models is often difficult to assess without using a highly qualified practitioner.

SUMMARY

Applicant recognized the problems noted above herein and conceived and developed embodiments of systems and methods, according to the present disclosure, for analyzing and improving machine learning inputs and outputs.

In an embodiment, a computer-implemented method includes receiving image data to a first machine learning system. The method also includes determining, based at least in part on one or more features of the image data; pixel information associated with a scale of the image data. The method further includes extracting the pixel information for the image data. The method also includes generating one or more patches associated with the image data, the one or more patches collectively forming the image data. The method includes generating one or more findings, using the first machine learning system, based at least in part on the one or more patches and the pixel information.

In an embodiment, a computer-implemented method includes receiving image data to a first machine learning system. The method also includes determining, based at least in part on one or more features of the image data; pixel information associated with one or more dimensional properties of the image data. The method further includes extracting the pixel information for the image data. The method includes generating one or more patches associated with the image data, the one or more patches collectively forming the image data. The method also includes generating one or more findings, using the first machine learning system, based at least in part on the one or more patches and the pixel information.

In another embodiment, a processor includes one or more circuits to receive image data to a first trained machine learning model. The one or more circuits are further to determine, based at least in part on a size of a first portion of image data, a first portion budget. The one or more circuits are to select, from the remaining image data, one or more additional portions based, at least in part, on the first portion budget. The one or more circuits are further to batch the first portion and the one or more additional portions into a group. The one or more circuits are to generate one or more model determinations using the group as a model input.

In another embodiment, a computer-implemented method includes receiving image data to a first trained machine learning model. The method also includes determining, based at least in part on a size of a first portion of image data, a first portion budget. The method further includes determining, based at least in part on one or more features of the first portion of image data, pixel information associated with a scale of the first portion of image data. The method also includes selecting, from the remaining image data, one or more additional portions based, at least in part, on the first portion budget. The method further includes batching the first portion and the one or more additional portions into a group. The method includes generating one or more model determinations using the group as a model input and the pixel information.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
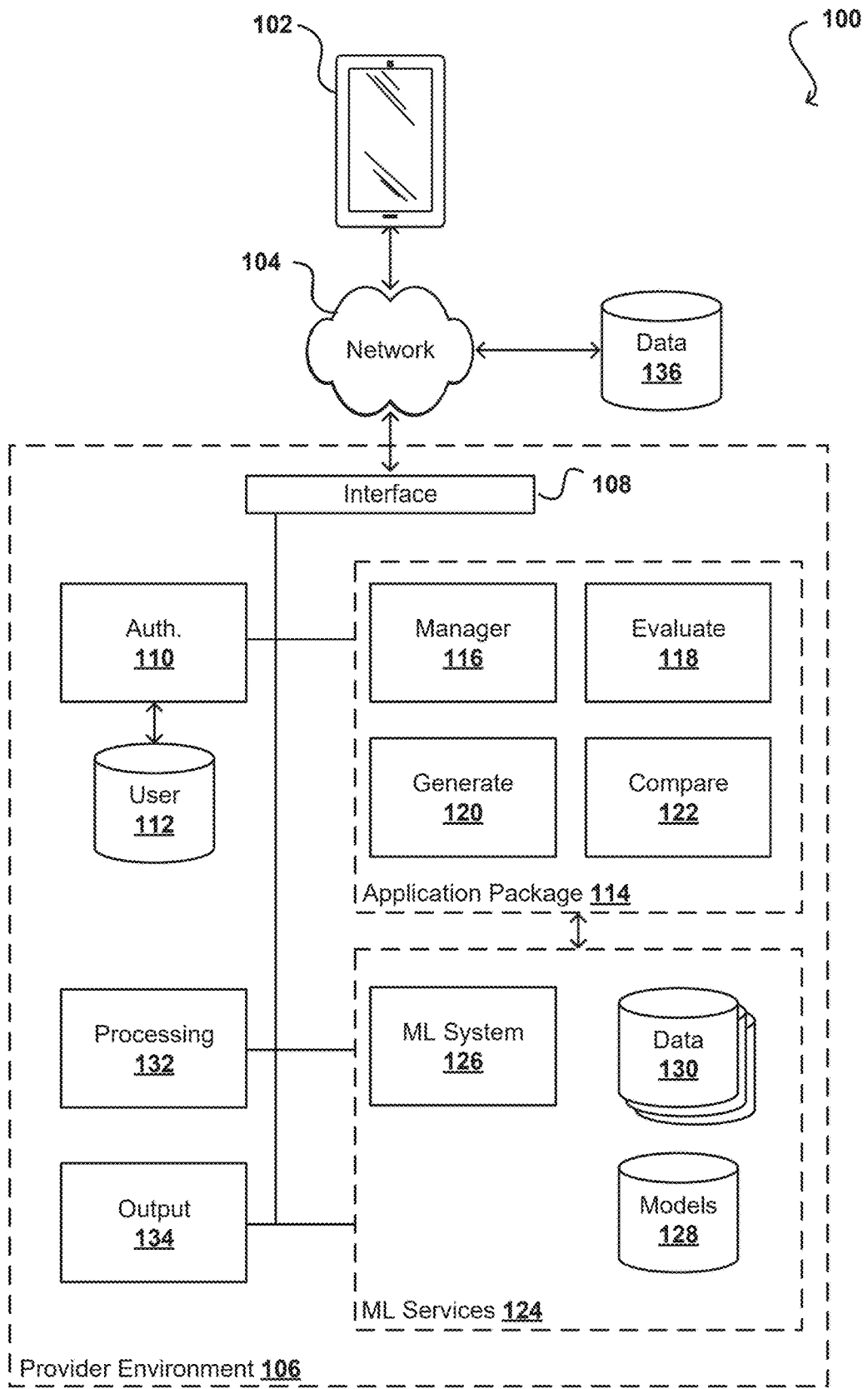
FIG. 1 illustrates an example environment for analysis of clinical data, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure. Moreover, references to "substantially" or "approximately" or "about" may refer to differences within ranges of +/−10 percent.

Embodiments of the present disclosure may be directed toward systems and methods to analyze, compare, and/or improve one or both of model outputs or model inputs associated with one or more trained machine learning systems. Embodiments may include content generation verification processes, classification comparisons, prioritization and identification of salient information within generated content, hallucination reduction, training data refinement, and/or image scaling methods for one or both of model inputs or outputs. In at least one embodiment, different components may be provided as part of a software suite, which may be accessible by one or more users, to evaluate different input data, which may include text data, image data, video data, audio data, and/or combinations thereof. The software suite may be associated with one or more trained machine learning (ML) or artificial intelligence (AI) models that may be used to analyze an input and generate one or more outputs associated with the input, which may be used to trigger one or more workflows or as a diagnostic tool by a practitioner, as discussed herein.

In at least one embodiment, systems and methods may include one or more evaluation components to evaluate a generated output based, at least in part, on a reverse evaluation of the output to an original input form. For example, one or more embodiments may include generating text based on an input image and then verifying the text by generating a second image using the generated text, where the second image may be compared to the input image using one or more metrics to determine a similarity score. Embodiments of the present disclosure may compare the images and/or the text (e.g., by generating a second set of text from the second generated image). In at least one embodiment, comparison may include systems and methods such as evaluating mean luminescence, pixel-by-pixel comparisons, keypoint detection (e.g., comparison of features), etc. In one embodiment, a discriminator from a generative adversarial network (GAN) may be used to compare the initial image and the generated image to determine differences between the images, where differences that exceed a threshold are indicative of poor reconstruction from the text. In this manner, text generation accuracy may be evaluated and tested to determine whether one or more models are accurately generating textual outputs from input images.

Systems and methods of the present disclosure may also be associated with one or more classifiers that may use generated output text as at least one source of classification. For example, one or more embodiments may be directed toward classification of clinical categories embedded within the text generated from an image. Systems and methods may address and overcome problems with existing techniques that may classify based on image information, which may not provide classifications on the rich verbal descriptions of the images, which may include more salient and/or clinically relevant information. By way of example, classifying an image as including an "abnormality" provides less useful clinical data than classifying an image as having an abnormality that is positioned proximate a major blood vessel. Embodiments may also be used with image classifiers to provide more fine-grained and targeted classifications.

Various embodiments of the present disclosure may further be directed toward systems and methods to identify and prioritize salient information within one or more generated model outputs. By way of example, systems and methods may incorporate one or more classifiers to identify certain categories or types of information, such as textual information within a generated textual output, to identify clinically relevant and/or prioritized information. For example, specific categories may be identified and then an alert or other indicator may be provided to a practitioner when such a category is identified. In at least one embodiment, the specific categories may be particularly selected based on one or more inputs and/or practitioner preferences, such as identifying information that may be indicative of a time-important medical emergency with more urgency than a general diagnosis. The alert may then be used to generate an actionable response, which may be part of an automated workflow or provide information to a practitioner to perform an action in real or near-real time.

One or more embodiments may also be used to improve models, which may include improving output responses generated by one or more trained ML or AI models. In at least one embodiment, systems and methods may be used to reduce hallucinations and/or reduce error rates by generating targeted training information that may be based, at least in part, on comparisons between generated content along a two-way reverse pipeline. For example, one or more models may be used to generate text based on an input image, and the text may then be used to generate a second image. Furthermore, the second image may be used to generate second text. The process may be repeated as desired and then the different sets of images and/or text may be compared to determine whether there is a threshold level of similarity with the text and/or images. The threshold may evaluate for a level of similarity based on one or more similarity metrics. It should be appreciated that the threshold may be an evaluation of whether or not a level of similarity exceeds a threshold, is below a threshold, is within a range, or combinations thereof. Furthermore, systems and methods may also incorporate different input parameters and/or criteria to determine whether the generated content is sufficiently similar, even if input parameters that should not affect output content are changed. By way of non-limiting example, one or more models may include different input parameters that may be used to simulate diagnostic information based on certain criteria, such as diagnostics from the perspective of a certain physician, information read at a certain time of day, or the like. Different criteria may be used to generate the outputs and then compared to one another to try and identify a consensus between the output clinical information. In at least one embodiment, the selection of input criteria may be tuned or particularly selected to select criteria or variables that should have limited or no affect on the model outputs. For example, an X-ray read at 9 am should have the same output as an X-ray read at 11 pm. Accordingly, comparisons between variables that should not affect outputs may be used to tune or otherwise adjust model weights or output parameters.

Systems and methods may also implement training data evaluation, filtering, and pruning applications. In at least one embodiment, systems and methods may be used to determine whether one or more changes or modifications made, by a human reviewer, to a model output is sufficiently related to one or more metrics or categories to qualify being included within updated training data. As one example related to models that are used for diagnostic or treatment data, physicians may review output information and then make one or more modifications. Often, these changes are stylistic and do not affect the overall diagnostic outcome. As a result, the changes to the output do not provide significant or relevant training information. Accordingly, the feedback may be classified and then filtered to reduce training data used to update the model that will not improve diagnostic outcomes.

Various embodiments of the present disclosure may further be directed toward one or more data input methods to adjust, scale, or otherwise code input information to improve diagnostic and/or treatment results associated with one or more trained models. In at least one embodiment, systems and methods may be directed toward pixel-based scaling techniques. For example, embodiments may be used to address and overcome problems associated with data input methods where an input size is restricted or otherwise scaled such that salient content may be reduced and/or eliminated from different image regions. In at least one embodiment, systems and methods may implement pixel-based scaling to address and overcome problems with existing scaling methods, which may be particularly noticeable with large inputs. For example, present techniques may receive input image data and section off the image data into "patches" of standard sizes that are provided to a model with location information (e.g., patch 1, patch 2, etc.). However, standard sizes may be unsuitable for various applications, such as a whole chest X-ray compared to a wrist X-ray. Because of the difference in sizes for these two images, fine detail may be lost during the scaling process. Embodiments of the present disclosure may be used to inject scale information into the model. For example, pixels may be correlated to different locations within the images and associated patches may include information based on pixel data. As a result, the post-processing techniques for resizing images, such as X-ray images, may be reduced and/or eliminated because scale information may be provided for different patches with respect to one another. Embodiments may also be directed toward dynamic adjustments of image lengths. For example, different input information to one or more models may include images that have variable lengths (e.g., more or fewer pixels). Currently, existing techniques attempt to resize images to fit a standard input size. However, resizing images may eliminate crucial information for accurate diagnostics. For example, a chest X-ray may be scaled and lose significant information. As another example, a joint may be X-rayed from several different angles or positions, and the cumulative information may be important for diagnostics, not just a single view. Embodiments may establish a "budget" for different patch sizes and may increase the budget based on the initial input size and/or diagnostic properties. As a result, images may be batched according to the initial image size and then processed together during training and inferencing. For example, a vector may be used to add tags to input information to differentiate between views, patients, diagnostic intent, etc. Systems and methods of the present disclosure may also implement position codings to establish scale between input images. Current models may map different coordinates to a table and then a look up operation is performed to try and correlate diagnostic information for different positions within an image. Present techniques suffer from the problems of many techniques with respect to improper scaling, which may distort or otherwise eliminate crucial diagnostic information. Embodiments may be used to establish a consistent scale between input images, for example based on a tunable parameter. Scale information may then be fed into the system as a parameter for consideration by the model during inference.

FIG. 1 illustrates an example system 100 that may be used with embodiments of the present disclosure. In this example, a computing device 102 (e.g., user device, compute device, client device, etc.) can submit a request over at least one network 104 to be received by a provider environment 106. The provider environment 106 may be an online platform provided by a service provider and/or for an affiliate, for example the environment 106 may be hosted or otherwise provided via one or more cloud resource providers on behalf of a service provider. The client computing device 102 may be a representative and/or act as a proxy for one or more users that may be submitting requests. For example, a user may navigate to one or more dashboards, web applications, landing pages, or access points using the device to submit a request, among other options. Additionally, in at least one embodiment, the client computing device 102 may act as a proxy to execute stored instructions to make and receive requests. For example, the client computing device 102 may send a request responsive to receiving one or more inputs and/or the like. As another example, a request may be transmitted as part of an automated or semi-automated workflow, which may or may not receive user interaction. Accordingly, the client computing device 102 may be used with direct input from one or more users, from stored software instructions, from executions of various workflows, or combinations thereof.

In at least some embodiments, the request can include a request to execute one or more workflows associated with analysis and/or processing of electronic health records (EHR), including evaluation of data (e.g., imaging data, video data, text data, audio data, combinations thereof, etc.), among other options. In many cases, this will include a request to access data (e.g., stored data, streaming data, etc.) and then to process the data using one or more workflows associated with the environment 106. In at least one embodiment, a selected workflow may be based, at least in part, on information provided by the computing device 102, such as a command, or based on data received by the environment 106. The network(s) 104 can include any appropriate network, such as the Internet, a local area network (LAN), a cellular network, an Ethernet, or other such wired and/or wireless network. The provider environment 106 can include any appropriate resources for accessing data or information, such as EHR, as may include various servers, data stores, and other such components known or used for accessing data and/or processing data from across a network (or from the "cloud"). Moreover, the client computing device 102 can be any appropriate computing or processing device, as may include a desktop or notebook computer, smartphone, tablet, wearable computer (e.g., smart watch, glasses, contacts, headset, etc.), server, or other such system or device.

An interface layer 108, when receiving a request or call, can determine the type of call or request and cause information to be forwarded to the appropriate component or sub-system. For example, the interface 108 may be associated with one or more landing pages, as an example, to guide a user toward a workflow or action. In at least one embodiment, the interface layer 108 may include other functionality and implementations, such as load balancing and the like.

Various embodiments of the present disclosure are directed toward processing and/or evaluation of EHR, among other features, and as a result certain data protection operations may be deployed. In at least one embodiment, an authentication service 110 may be associated with the provider environment 106 to verify credentials provided by the client device 102, for example against a user datastore 112, to verify and permit access to the environment 106. Furthermore, in at least one embodiment, verification may also determine a level of accessibility within the environment 106, which may be on an application-basis, a user-basis, or some combination thereof. For example, a first user may have access to the environment, but only have a limited set of applications that are accessible, while a second user may have access to more applications, and a third user may be entirely barred from the environment. In this manner, access may be controlled and information related to EHR may be protected.

Systems and methods may include a web-based or application-based portal that permits receipt, analysis, and evaluation of information, such as EHR, that may include multi-modal information including text data, video data, image data, audio data, and/or combinations thereof. In at least one embodiment, an application package 114 may be executable within the environment 106 to provide functionality to the client device 102 according to one or more embodiments. In this example, the application package 114 may be associated with different sets of executable software instructions, which may share one or more underlying resources, to perform one or more tasks. The applications illustrated in FIG. 1 are provided by way of non-limiting example, and include at least an applications manager 116, which may be used to specify one or more parameters for the different applications associated with the application package 114. For example, the applications manager 116 may be used to set various operating parameters, identify one or more different data sources, tune various settings, and/or the like. In at least one embodiment, the applications manager 116 may include a pre-set series of workflows or processes to simplify or otherwise guide users through a process to execute one or more applications, thereby increasing adoption of the system while also providing guidance to users. For example, a user may indicate that it is desired to have an X-ray analyzed to identify abnormalities. Systems and methods may provide an interface within the applications manager 116 to select the desired use case and then guide the user through selection of various models, or automatically select an appropriate model, to execute the desired task.

Applications in this example also include an evaluation engine 118, a generation engine 120, and a comparison engine 122, but it should be appreciated that more or fewer applications may be used and the illustrated engines are by way of non-limiting example. In at least one embodiment, the evaluation engine 118 may be used to evaluate one or more regions of an image, sequence of text, audio segment, and/or combinations thereof. For example, evaluation may include classifying objects within an image, identifying one or more features within an image, classifying areas of text, and/or combinations thereof. In at least one embodiment, one or more trained ML models may be used to perform different evaluations of input data. The evaluation may further include content generation using the generation engine 120, which may incorporate one or more additional trained ML models and/or may use the same model used for classification and/or same suite of models. For example, embodiments may include generation of text to describe an input image, among other options. The comparison engine 122 may also incorporate one or more new ML models and/or use existing models, such as discriminators, in order to compare different features within images, text, audio, and/or the like. In this manner, a variety of different applications may be deployed for diagnostic and/or treatment purposes.

As noted herein, various embodiments may be directed toward EHR, such as image data obtained from one or more diagnostic and/or treatment tools, including by way of non-limiting example, an endoscope. While embodiments may be described with respect to endoscopes and endoscopy, it should be appreciated that systems and methods may be extended to various other applications and tools. In this example, information may be provided to the environment 106 that includes data, which may be image data (e.g., video, still images, diagnostic notes), audio data (e.g., recorded audio, audio extracted from a video, auditory notes generated before or during the procedure, etc.), textual data (e.g., notes inputted before, after, or during the procedures), and/or combinations thereof associated with one or more diagnostic and/or treatment procedures. As discussed herein, the diagnostic and/or treatment procedures may optionally combine imaging devices and/or tools that may be used to perform certain actions on the patient undergoing the treatment, such as tools to interact with the patient. Furthermore, the one or more tools may be used to manipulate or otherwise adjust the imaging device, such as to advance or rotate a camera, among other options. The user may wish to provide the information to the application package 114 in order to analyze or otherwise provide feedback on different aspects within the data. Various embodiments may incorporate one or more ML systems to receive and process the data to identify different features or interest. These features of interest may then be correlated with a diagnosis and/or with one or more skills or tasks performed by a practitioner during the procedure that produced the data.

In at least one embodiment, systems and methods of the present disclosure deploy one or more ML services 124, which may include execution of different software instructions based, at least in part, on a request received from the user device. In this example, the ML services 124 may include different ML systems 126 that may be used to execute one or more models associated with one or more model datastores 128 to accomplish a given task. These models 128 may be trained and or execute using one or more different datastores 130, which may include training data, model parameters, model settings, rules, and/or the like. The training data, which may be labeled or unlabeled, and also may be augmented or otherwise influenced by one or more human reviewers, but it should be appreciated that raw training data may be used with one or more self-supervised learning processes.

In at least some embodiments, language models, such as large language models (LLMs) or visional language models (VLMs) and/or other types of generative artificial intelligence (AI) may be implemented as part of the ML service 124. These models may be capable of understanding, summarizing, translating, and/or otherwise generating text (e.g., natural language text, labels, etc.), images, video, and/or the like, based on the context provided in input prompts or queries. The models (e.g., LLMs, VLMs, etc.) may be used for summarizing textual data, analyzing and extracting insights from data (e.g., textual, image, video, etc.), and generating new content (e.g., text, image, video, audio, etc.). Various embodiments may also include single modality models (e.g., exclusively for text or image processing) or multi-modality models (e.g., receiving combinations of inputs). For example, VLMs may accept image, video, audio, textual, 3D design, and/or other inputs data types and/or generate or output image, video, audio, textual, 3D design, and/or other output data types.

Various types of architectures may be implemented in various embodiments, and in certain embodiments, architecture may be technique-specific. As one example, architectures may include recurrent neural networks (RNNs) or long short-term memory networks (LSTMs), transformer architectures (e.g., self-attention mechanisms, encoder and/or decoder blocks, etc.), convolutional neural networks (CNNs), and/or the like.

In various embodiments, the models may be trained using unsupervised learning, in which models learn patterns from large amounts of unlabeled training data (e.g., text, audio, video, image, etc.). Furthermore, one or more models may be task-specific or domain-specific, which may be based on the type of training data used. Additionally, foundational models may be used and then tuned for specific tasks or domains. Some types of foundational models may include question-answering, summarization, filling in missing information, and translation. Additionally, specific models may also be used and/or augmented for certain tasks, using techniques like prompt tuning, fine-tuning, retrieval augmented generation (RAG), adding adapters, and/or, the like.

During operation, a processing service 132 may be used to prepare data and/or request data, for example responsive to instructions received from the manager 116, for use by the one or more applications. For example, processing may include one or more pre-processing or post-processing steps, such as image scaling, color enhancement, and/or the like. In at least one embodiment an output service 134 may be used to provide information to the user responsive to processes executed by the one or more applications. Outputs may include visual outputs, audio outputs, data outputs, and/or combinations thereof.

In operation, a user associated with the device 102 may be a provider of one or more diagnostic and/or treatment services. The user may wish to access an available platform in order to receive diagnostic and/or treatment information associated with a procedure, such as an imaging procedure, that was performed on one or more patients. The user may submit a request to the environment 106, which may include providing data from one or more datastores 136, which may be remote or local, acquired during the procedure, such as image data, diagnostic notes, prior information for the patient, and/or the like. Based on the information, the user may use the manager 116 to select one or more applications for processing of the data. The manager 116 may then be used to provide access to the data 136, for example using the authentication service 110, for execution of one or more different workflows.

Figure 2A:
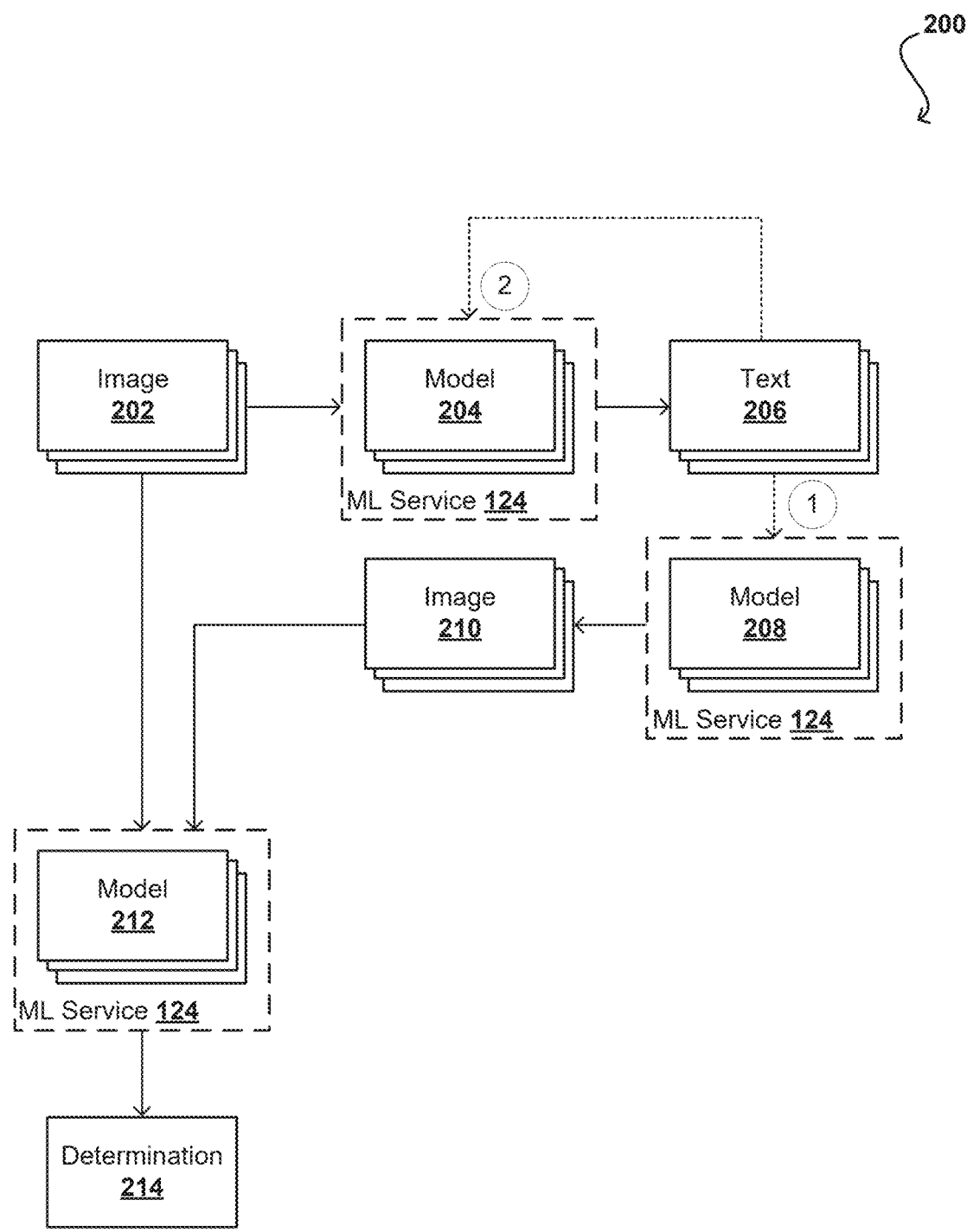
FIG. 2A illustrates an example environment for evaluating output from one or more trained models, in accordance with embodiments of the present disclosure.

FIG. 2A illustrates an example environment 200 that may be used with embodiments of the present disclosure. In this example, a verification and comparison process is shown between content generated by one or more ML models. The illustrated example is associated with technology that may be used to convert images to text and text to images, but other processes may also be used within the scope of the present disclosure. For example, various different modalities may be used including, but not limited to, text, video input data (e.g., images, image frames from a video, etc.), audio (e.g., waveforms, time series, audio extracted from videos, etc.), two or three-dimensional (2D or 3D) models (e.g., meshes, point clouds, neural radiance fields, 3D generated presentations from scan data, etc.), discreet data (tabular information, database information, etc.), and or combinations thereof. In this example, image data 202 is provided to one or more ML models 204 associated with the ML service 124. The one or more models 204 in this example may be image-to-text models that may be used to evaluate one or more images and generate text associated with the image based on, for example, one or more parameters or prompts. For example, image-to-text model may include VLMs that are used to generate text associated with content that is identified within the one or more images. As another example, the text-to-image model may include a diffusion model, a transformer-based generation model (e.g., VQ-GAN), or a variety of other image generation models. In one or more embodiments, the text-to-image model may be a dedicated image generation model or may be a model that can perform text-to-image generation along with a variety of other tasks. Additionally, comparisons may be made using one or more LLMs. As discussed herein, the examples including images, text, and the like are by way non-limiting example for clarity and conciseness. Other embodiments may include generating images based on an audio input, generating text based on discreet data, generating text based on input 3D models, and/or combinations thereof.

The one or more models 204 may be used to procedure a textual output 206. The textual output 206 may be formatted in accordance with one or more preferences and may include information associated with one or more regions the image 202. For example, if the input image 202 was a chest X-ray, the output may include an evaluation of portions of the chest X-ray, such as identification of an anomaly, clinical findings, and/or the like. The output 206 may also include generate content such as an impression or suggested diagnosis. Accordingly, the output 206 may include different output regions, such as one region that identifies objects, one region with clinical findings, one region with impressions or diagnosis, and/or combinations thereof.

In at least one embodiment, it may be desirable to determine whether or not the textual output 206 has a threshold level of accuracy. Systems and methods may provide for a comparative technique that may use one or more additional models 208, which may be the same one or more models 204 or different models, to generate a comparative output for evaluation against the initial input. In this example, along the path noted with the numeral 1, the textual output 206 is provided to the one or more models 208, which may be associated with the ML service 124, to generate one or more image outputs 210. Alternatively, in certain embodiments, the path noted with the numeral 2 may use the same one or more models 204 associated with the ML service 124 to generate the textual output 206. However, it should be appreciated that different models may be used or needed, for example, a diffusion model or other image generation model may be used, with the textual output 206 forming a portion of a prompt, to generate one or more image outputs 210.

Systems and methods may be used to compare the initial input image 202 and the image output 210 to compare one or more differences, for example based on one or more similarity metrics, to identify one or more scores for the one or more models 204, 208 to determine whether it is desirable or needed to retrain or otherwise modify the weights or parameters associated with the one or more models 204, 208. For example, one or more models 212 of the ML service 124, which may include one or more of the models 204, 208, may be used to compare the images 202, 210. In at least one embodiment, the one or more models 212 may include a discriminator that is used to determine one or more differences between a ground truth (e.g., the image 202) and a generated image (e.g., the image 210) as a gradient that may be used to update or adjust various weights or parameters for an associated generation model. A determination 214 from the one or more models 212 may be used to determine whether to retrain one or more of the models and/or to determine whether sufficient training is reached to deploy the one or more models for use.

While embodiments of the present disclosure may describe the one or more models 212 as discriminators, it should be appreciated that a variety of other image comparison techniques may be used within the scope and context of the present disclosure, such as mean luminescence, pixel-by-pixel comparisons, keypoint detection (e.g., comparison of features), etc. Furthermore, while this example includes comparison of the images 202, 210, one or more embodiments may use the model 204 to generate text based on the image 210 and then compare the output text with the text 206. In this manner, models may be evaluated for accuracy to determine whether training is sufficient. Moreover, systems and methods may be used to identify particular portions of the models that may need special attention. For example, the comparison may be evaluated for one or more different features with individual scores to target retraining efforts.

Embodiments of the present disclosure may be directed toward evaluations that may be performed in real or near-real time with respect to diagnosis and/or as training processes, among other options. For example, during training, images may be processed by the one or more models, converted to text, the text may be converted to a second image, and then the images may be compared using one or more similarity metrics to determine a level of similarity between the images. If the images are sufficiently similar, then no more training may be necessary based on one or more stop criteria. However, if the images are not sufficiently similar, weights may be updated for one or more models, where the process may iterate until a stop criteria is satisfied for model deployment. It should be appreciated that various embodiments may also be implemented during inference and/or diagnostics to temporarily update models and/or to perform inference multiple times that may not lead to retraining or updating the models. For example, a physician may process the image 202 using one or more models 204 to generate the text 206 and then use one or more models 208 to generate the image 210. The physician may then make a similarity determination, and/or may use the determination 214 generated by one or more models 212, and may then decide to run the image 202 a second time. This process may be performed iteratively until the physician is satisfied with the output results. Subsequent processes may use updated weights and/or may use the same weights. At the end, new weights may be stored and then used to update the model or may be discarded. In this manner, one or more operators can receive updated and/or repeated inference operations without waiting for model update and/or without affecting the model weights, which may be locked by an administrator.

Figure 2B:
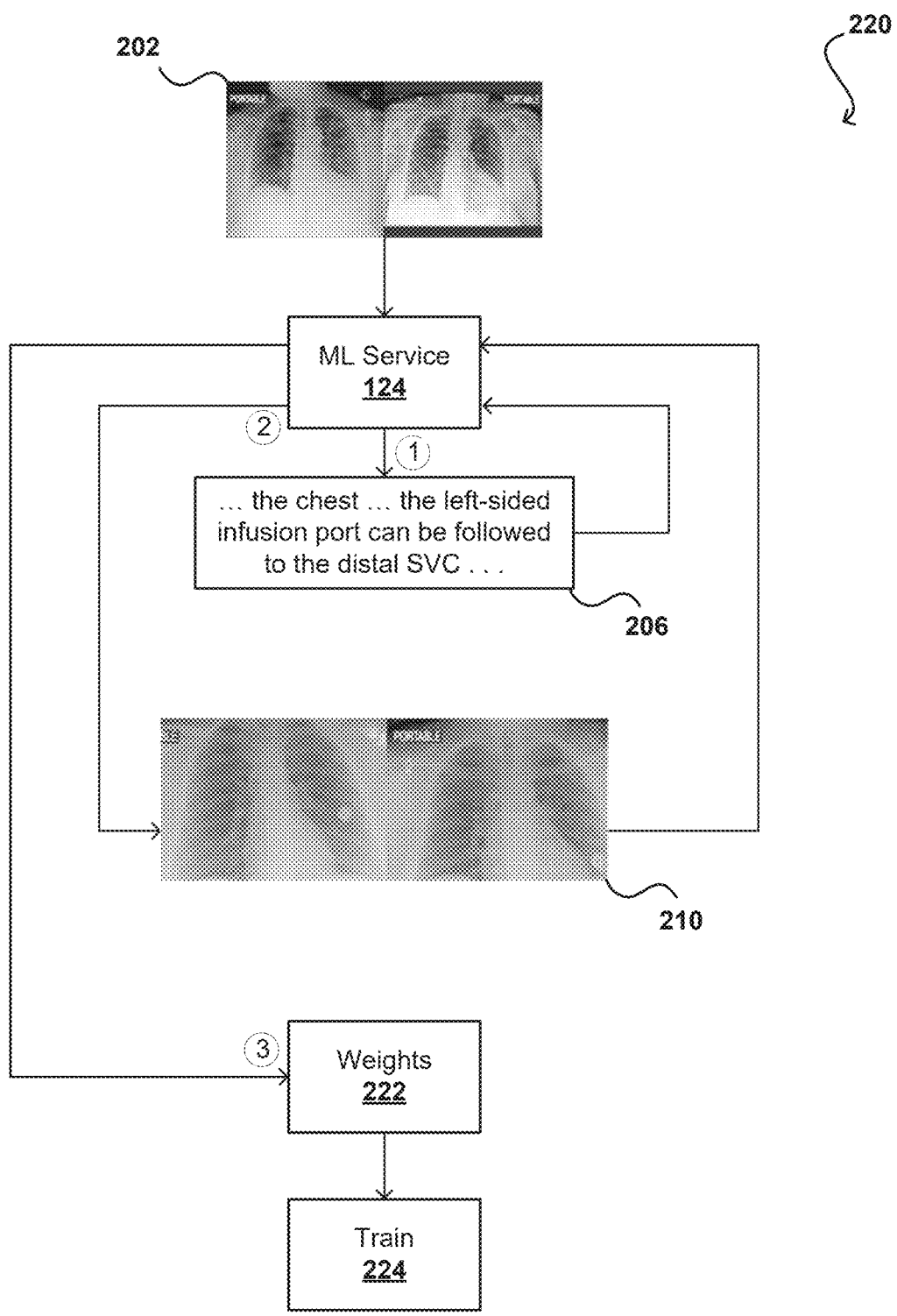
FIG. 2B illustrates an example environment for evaluating and updating one or more models based on model out data analysis, in accordance with embodiments of the present disclosure.

FIG. 2B illustrates an example environment 220 for a generation and evaluation process used to update weights for one or more ML systems. In this example, the image 202 is provided to the ML service 124, which may include one or more models as discussed herein, to generate the output text 206, as represented by the numeral 1. In at least one embodiment, the ML service 124 may include a VLM that processes information within the image 202, such as identifying features or the like, and then produces the output text 206. The output text 206 may then be provided back to the ML service 124 to generate one or more output images 210, as represented by the numeral 2. For example, one or more diffusion models may use the text output 206 to produce an output image. The output image 210 and the image 202 may then be evaluated by the ML service 124 to generate one or more weights 222 that may be used to retrain a model using a training service 224, as represented by the numeral 3. For example, if the ML service 124 was to determine that difference between the images 202, 210 exceeded a threshold, multiple weights may be updated. As discussed herein, the determination may be evaluated based one or more similarity metrics and the determination of level of similarity may be with respect to one or more thresholds (e.g., above a threshold, below a threshold) and/or one or more ranges (e.g., within a range, outside of a range). As another example, different features may be individually characterized to target different weights or updates to the system. In this manner, embodiments of the present disclosure may evaluate different generated content elements to evaluate accuracy compared to one or more ground truths and determine whether or not to update different models. Additionally, systems and methods may be used to identify weaknesses within various models, which may provide indicators for practitioners to more closely evaluate or review different generated content.

Systems and methods of the present disclosure may be used in a variety of applications including training applications and at-inference evaluations. For example, one or more embodiments may be directed toward comparing two images together at inference time, performing minor training updates at inference based on the comparison, and then perform additional inference. Furthermore, in at least one embodiment, additional images and modifications to those images may also be used. For example, an input image may be modified by a reviewer, such as by cropping the image and/or rotating the image, and then that modification may be used to further train the model. Embodiments may use the initial input image for training adjustments prior to generation of the output text. For example, the initial input may be rotated or scaled and then fed back into the model for training so that the model would be invariant to minor perturbations. Thereafter, systems and methods may be used to execute the model to generate text, pass the text for image generation, and so forth. Similarly, it should be appreciated that the description of a single image and a single output is provided by way of simplified example and not intended to limit the scope of the present disclosure, and various embodiments may incorporate multiple versions of the initial input image, multiple changes to the images, and so forth. Systems and methods may further be directed toward a repetitive process where multiple images and textual outputs may be generated, evaluated, used to train the model, and then the changes may be discarded upon completion of one or more tasks.

Figure 3A:
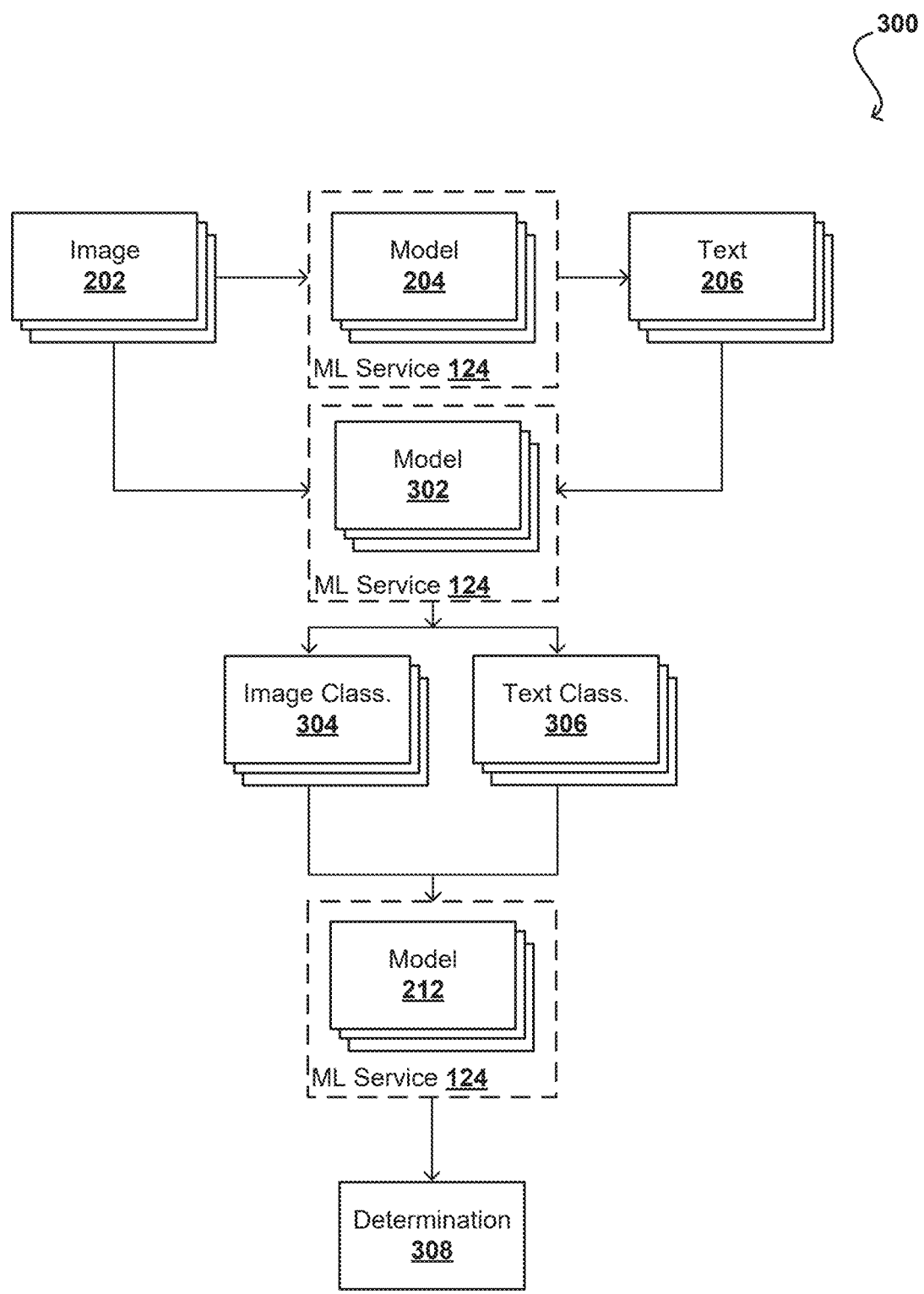
FIG. 3A illustrates an example environment for evaluating output from one or more trained models, in accordance with embodiments of the present disclosure.

FIG. 3A illustrates an example environment 300 that may be used with embodiments of the present disclosure. In this example, a verification and comparison process is shown between tags and/or classifications generated by one or more ML models. In this example, the ML service 124 may include one or more models 204, as discussed herein, to convert the input image 202 into the textual output 206. For example, a VLM may receive one or more images and generate text associated with items within the image. However, as discussed herein, embodiments are not limited to text and image generation/evaluation and a variety of modalities may be used within the scope of the present disclosure. In at least one embodiment, it may be desirable to compare an accuracy of the one or more models 204 to determine whether significant features and/or one or more desired classifications or tags were identified within the image 202. While missing certain tags may be unimportant from a diagnostic perspective, such as not identifying a normal rib within a chest X-ray, missing a tumor may be a poor clinical evaluation that can be addressed by updating the one or more models 204.

In this example, the ML service 214 may further include one or more models 302 that may be associated with classifiers. As discussed herein, classifiers and/or classification may also be part of the one or more models 204 or various other models of the ML service 124. In operation, the one or more models 302 may be used to generate one or more image classifications 304 and one or more text classifications 306. The classifications may be associated with items identified within the image and/or text, a general theme or overall description of the image and/or text, and/or combinations thereof. In at least one embodiment, the one or more models 302 may include a first model for the image classifications 304 and a second model for the text classifications 306. For example, the image classifications 304 may be associated with one or more grounding models, such as models that generate bounding boxes and/or labels. The one or more text classifications 306 may be associated with one or more LLMs that may take an input text, along with a prompt, and then generate a list of items within the input text, as one example.

In at least one embodiment, the ML service 214 may further implement the one or more models 212 to compare the classifications 304, 306. For example, if the resultant classifications included two different lists, then one or more LLMs may be used to identify or otherwise determine which classifications were missing from the respective lists. The missing classifications could then be evaluated against one or more target lists to determine whether salient or important classifications are missing and/or if the list should be updated or modified to add additional classifications. In at least one embodiment, systems and methods may generate one or more determinations 308 with respect to the classification comparison. Overlapping classifications that exceed a threshold may be indicative of good performance for the one or more models 204 (e.g., performance that exceeds a target). However, overlapping classifications that are below the threshold may be indicative of a need to retrain and/or evaluate outputs more closely. In this manner, additional metrics for comparison of model outputs may be generated.

Figure 3B:
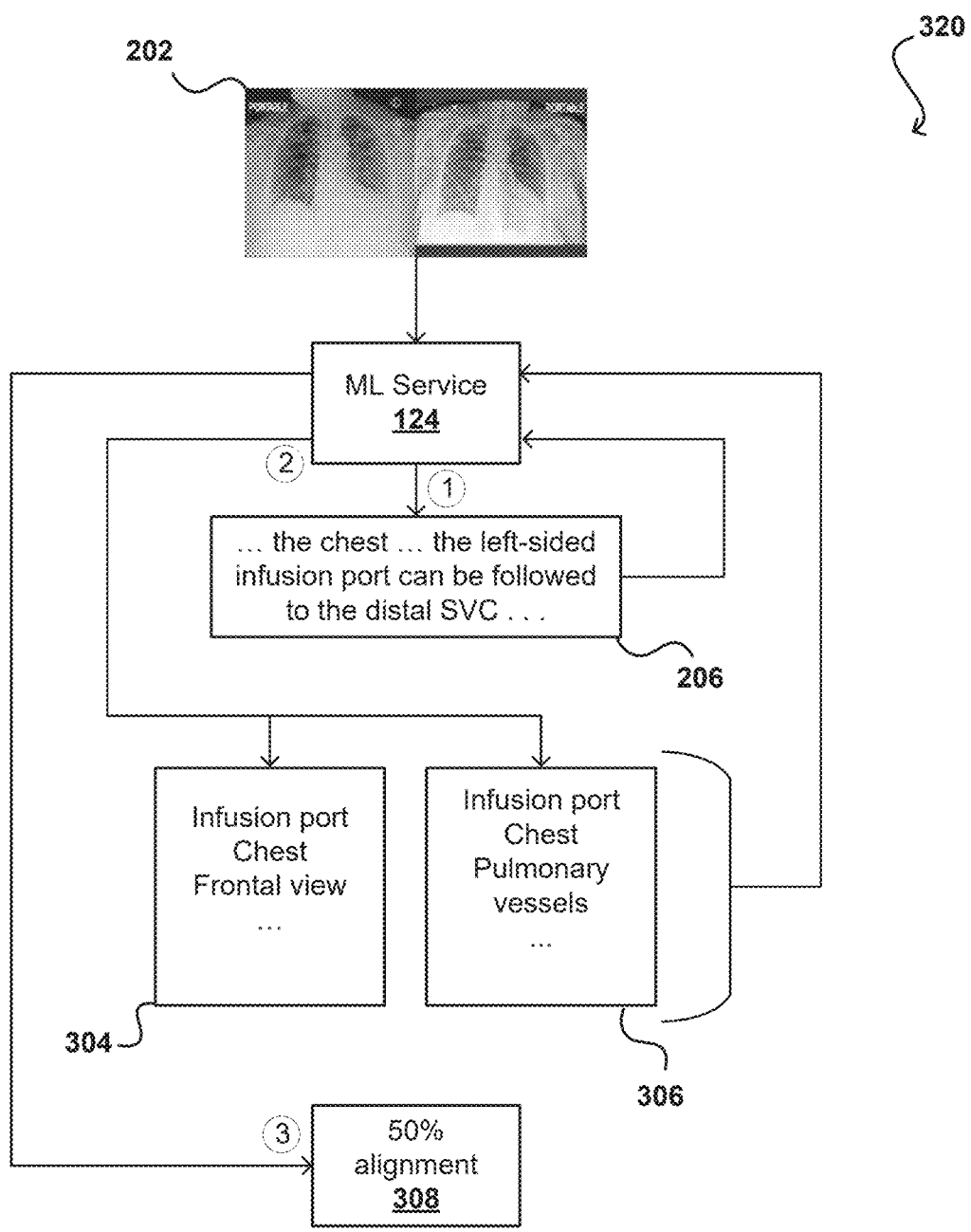
FIG. 3B illustrates an example environment for evaluating one or more models based on model out data analysis, in accordance with embodiments of the present disclosure.

FIG. 3B illustrates an example environment 320 for a generation and evaluation process used to evaluate alignment and classifications between for one or more ML systems. In this example, the image 202 is provided to the ML service 124, which may include one or more models as discussed herein, to generate the output text 206, as represented by the numeral 1. In at least one embodiment, the ML service 124 may include a VLM that processes information within the image 202, such as identifying features or the like, and then produces the output text 206. The output text 206 may then be provided back to the ML service 124, along with the image 202, to generate one or more classifications, such as the image classifications 304 and the text classifications 306, as represented by the numeral 2. The collected classifications 304, 306 may then be compared or otherwise evaluated to determine an alignment or similarity between the classifications, as represented by the numeral 3. The resultant determination 308 may be used to analyze one or more metrics to identify opportunities to retrain models or otherwise adjust various parameters to increase a likelihood that the text output 206 matches the representation provided in the image 202. For example, in this case, there is a 50% alignment between the image classifications 304 and the text classifications 306 (e.g., both include "infusion port" and "chest"). If the alignment were below a threshold, one or more updates may be applied to at least one of the models, for example, by retraining the models.

Figure 4A:
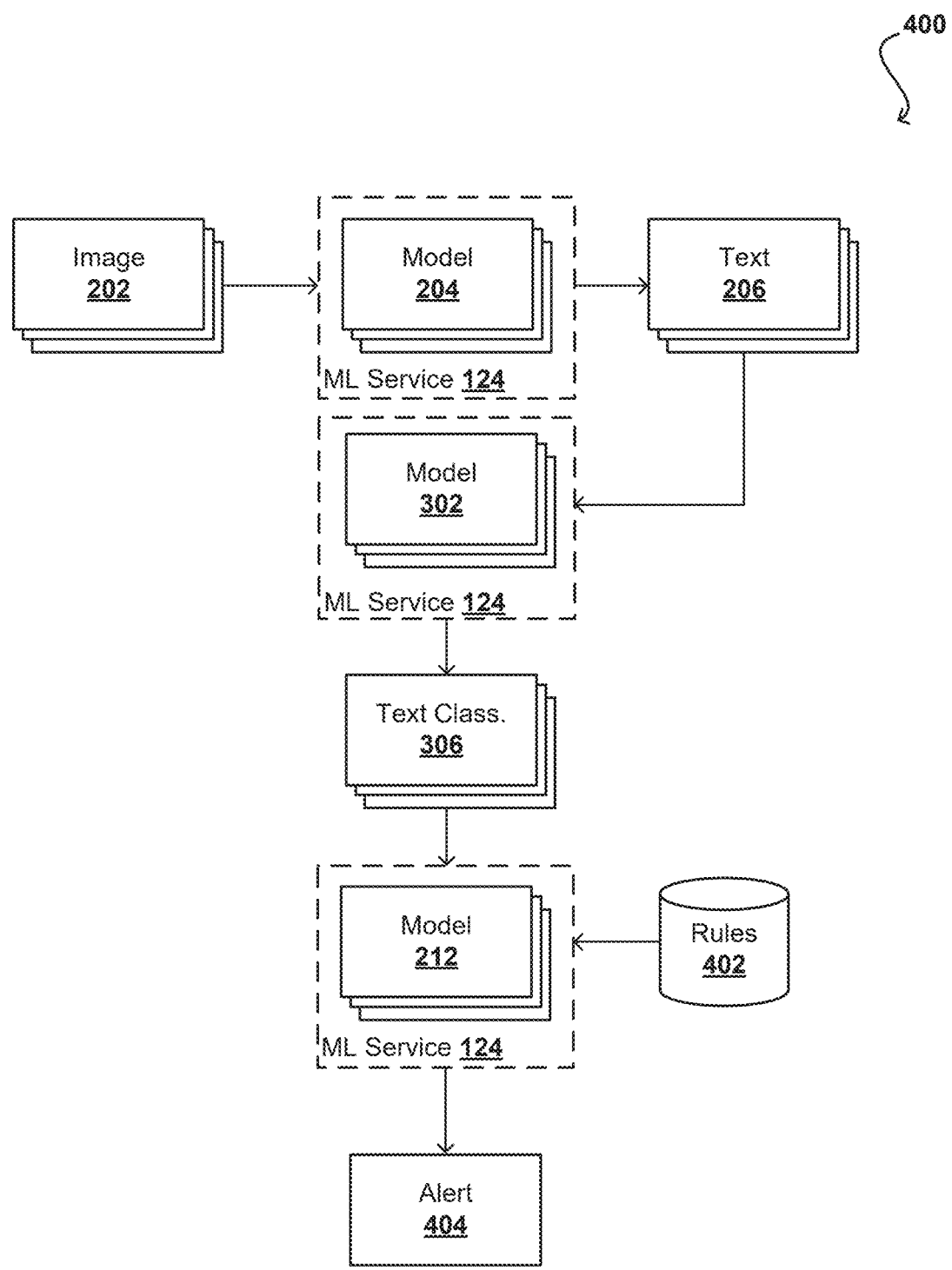
FIG. 4A illustrates an example environment for evaluating output from one or more trained models to generate a priority alert, in accordance with embodiments of the present disclosure.

FIG. 4A illustrates an example environment 400 that may be used with embodiments of the present disclosure. In this example, a classification and alert process is shown in order to rapidly identify one or more classifications within a textual output that may be indicative of needing prompt intervention. In this example, the ML service 124 may include one or more models 204, as discussed herein, to convert the input image 202 into the textual output 206. However, as discussed herein, embodiments are not limited to text and image generation/evaluation and a variety of modalities may be used within the scope of the present disclosure. In this example, the ML service 214 may further include one or more models 302 that may be associated with classifiers. As discussed herein, classifiers and/or classification may also be part of the one or more models 204 or various other models of the ML service 124. In operation, the one or more models 302 may be used to generate one or more text classifications 306. The classifications may be associated with items identified within the text, a general theme or overall description of text, and/or combinations thereof. In at least one embodiment, the one or more models 302 may include a variety of models, such as VLMs, LLMs, grounding models, and/or the like.

In at least one embodiment, the ML service 214 may further implement the one or more models 212 to compare the classifications 306 against one or more rules from a rules datastore 402. For example, the rules may be associated with one or more identifiable conditions and/or with certain combinations of conditions that may be indicative of a need for intervention. For example, the rules may associate an observable condition (e.g., a hole in the heart) with a clinical indication (e.g., low blood pressure) to generate one or more alerts 404 to rapidly notify practitioners of an action to be taken associated with the patient. In this manner, classifications and/or indications with a threshold level of importance can be identified and acted on quickly through the use of filtering out and identifying certain types or sets of data that may be indicative of various clinical concerns.

Figure 4B:
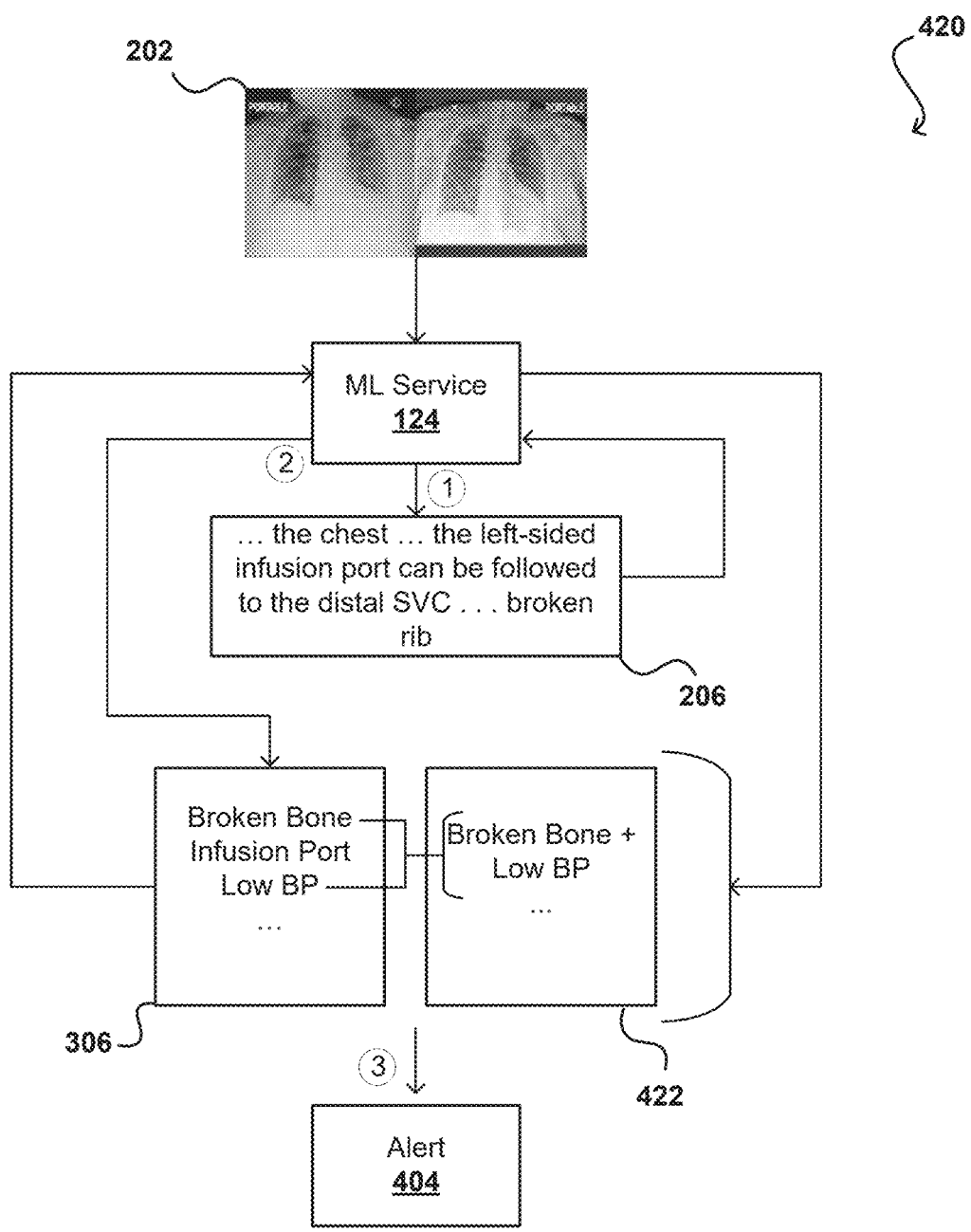
FIG. 4B illustrates an example environment for generating an alert based on model output analysis, in accordance with embodiments of the present disclosure.

FIG. 4B illustrates an example environment 420 for an evaluation process based on one or more classifications from a generated textual output that may be used with embodiments of the present disclosure. In this example, the image 202 is provided to the ML service 124, which may include one or more models as discussed herein, to generate the output text 206, as represented by the numeral 1. The output text 206 may then be evaluated by the ML service 124, for example using one or more LLMs, in order to generate the text classifications 306, as represented by the numeral 2. The classification may use information extracted the output text 206, clinical information, and/or combinations thereof.

In at least one embodiment, the classifications 306 may be evaluated using the ML service 124, for example against one or more rules 422, to determine whether certain classifications, or combinations of classifications, are present within the classifications 306. If there is a match between the one or more rules 422 and the classifications 306, then the alert 404 may be generated, as represented by the numeral 3. As a result, certain combinations of conditions or classifications may be rapidly identified and flagged to permit faster intervention.

Figure 5A:
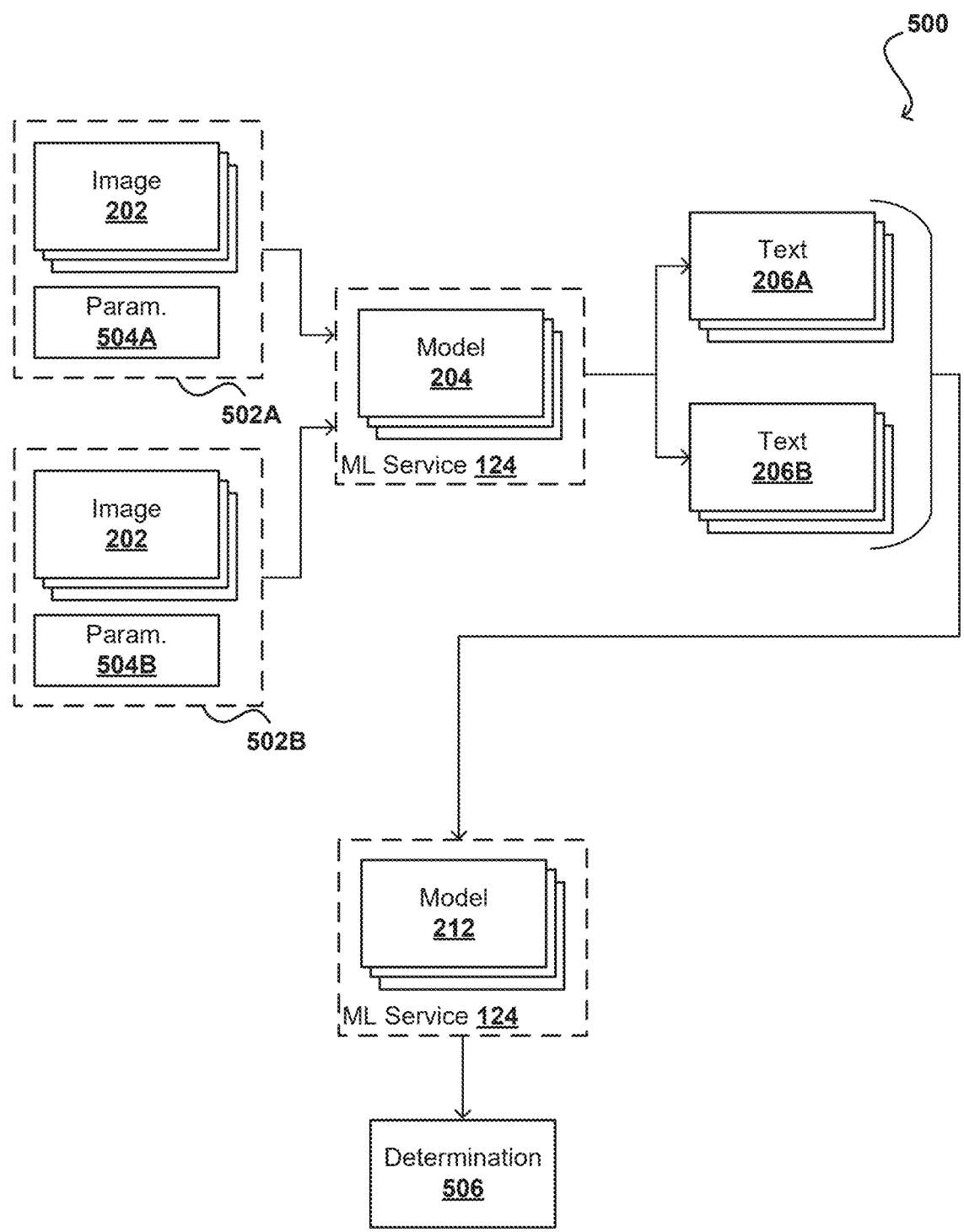
FIG. 5A illustrates an example environment for evaluating output from one or more trained models, in accordance with embodiments of the present disclosure.

FIG. 5A illustrates an example environment 500 that may be used with embodiments of the present disclosure. In this example, systems and methods may be deployed in order to evaluate model output accuracies in order to reduce hallucinations and/or to tune models based on one or more parameters. One or more embodiments may be used to test and compare model outputs based, at least in part, on one or more adjustable input parameters associated with a common image. The input parameters may be considered to be non-informative with respect to an output. In other words, certain parameters should not influence a resultant output set of results produced by the one or more models because the parameters should not change the underlying task and/or information associated with accomplishing a task. By comparing outputs based on different parameters provided to a common input, systems and methods may be used to determine whether models are improperly influenced by parameters that should not affect results, and as a result, may adjust or tune one or more weights accordingly.

While the embodiment of FIG. 5A is directed toward using the one or more models 204 of the ML service 124 to convert image data into text, for example using one or more VLMs, among other options, it should be appreciated that various embodiments of the present disclosure may also be used with different types of models 204. Furthermore, as discussed herein, embodiments are not limited to text and image generation/evaluation and a variety of modalities may be used within the scope of the present disclosure. In this example, the input image 202 is common between a first set of input data 502A and a second set of input data 502B. That is, the same image 202 is analyzed by the one or more models 204. However, in this example, different parameters 504A, 504B are included within the sets of input data 502A, 502B. The parameters may be associated with one or more conditions or situations with respect to the image 202 that, while providing a differentiating characteristic, are configured to not affect the results outputs of the one or more models 204.

By way of example, if the images 202 were associated with an X-ray, the time of day that the X-ray is evaluated should not affect the analysis and overall conclusions derived from the X-ray. That is, if a physician were to look at the X-ray at 9 am or at 9 μm, the physician should generate the same diagnosis. Similarly, if the physician were to review the X-ray on a weekend compared to a weekday, the diagnosis and overall analysis should be the same. Accordingly, systems and methods of the present disclosure may identify one or more of these parameters that, while being recorded with data and providing some sense of adjustment to the overall input data, should not affect the overall outputs of the model because the time of day an X-ray is reviewed is not relevant to the content of the X-ray itself. By adjusting these parameters, systems and methods may be used to compare model outputs to determine whether the one or more models 204 are improperly using information that should not change output information.

As shown in FIG. 5A, the first set of input data 502A and the second set of input data 502B include the same image 202 and different parameters 504A, 504B, respectively. The sets of input data 502A, 502B are then provided to the one or more models 204 for analysis. For example, the one or more models may include one or more VLMs that evaluate the images 202 for features or characteristics and then generate respective textual outputs 206A, 206B. As discussed here, the textual outputs 206A, 206B should be substantially similar in that, while tone or other features may be different, the resultant diagnosis or evaluation of the image should be similar within some threshold. Systems and methods of the present disclosure may then use the one or more models 212 to compare the textual outputs 206A, 206B to one another based on, for example, particular characteristics or features within the outputs 206A, 206B. For example, the one or more models 212 may include one or more LLMs that are prompted to compare the different outputs 206A, 206B to identify similarities and/or differences. Thereafter, a determination 506 may be generated as an analysis or evaluation of the similarity, or lack of similarity, between the output 206A, 206B.

Figure 5B:
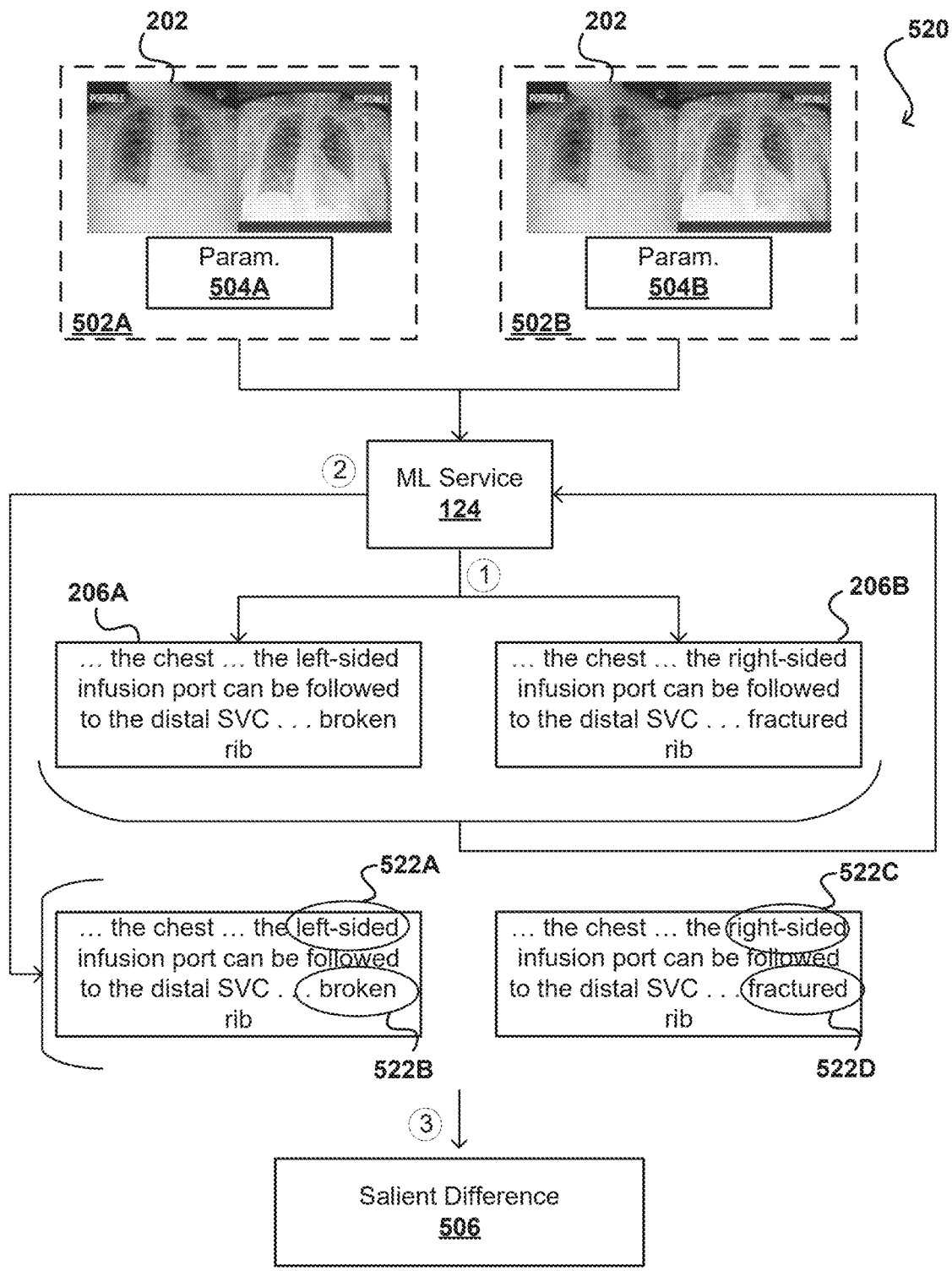
FIG. 5B illustrates an example environment for evaluating one or more models based on model out data analysis, in accordance with embodiments of the present disclosure.

FIG. 5B illustrates an example environment 520 comparing output data generated using different input parameters for a common input image. In this example, the sets of input data 502A, 502B are processed by the ML service 124, which may include one or more machine learning models as discussed herein. The illustrated sets of input data 502A, 502B include the same image 202, but different parameters 504A, 504B. As discussed herein, the parameters 504A, 504B may be particularly selected to include parameters that should not and/or have a low likelihood of affecting the outputs 206A, 206B. For example, the time of day that the image 202 is evaluated should not change the evaluation of the image. Similarly, the day of the week or the period between image acquisition and image evaluation should not affect the outputs 206A, 206B. By comparing the outputs 206A, 206B after evaluation using the different parameters 504A, 504B, systems and methods of the present disclosure may be used to determine whether the one or more models associated with the ML service 124 are incorrectly applying the parameters 504A, 504B, which may provide an indication of model hallucinations and/or a desire to retrain or otherwise modify weights of the one or more models. In this example, the ML service 124 may be used to evaluate the different input data sets 502A, 502B to generate the outputs 206A, 206B, as represented by the numeral 1.

In this example, the outputs 206A, 206B correspond to different textual outputs describing one or more features within the image 202. It should be appreciated that other embodiments may provide different outputs 206A, 206B such as a labeled and/or segmented image, and/or the like, and that the textual output is provided by way of non-limiting example. The outputs 206A, 206B may then be processed by the ML service 124, for example using one or more models, such as an LLM to compare the text within the outputs 206A, 206B.

The numeral 2 illustrates a representative comparison of the two outputs 206A, 206B provided for illustrative purposes. As shown in the example, different features 522A, 522B, 522C, 522D are highlighted or otherwise noted for clarity and emphasis. The comparison between the outputs 206A, 206B may be used to identify differences or changes that exceed some threshold of similarity. For example, the difference between the feature 522A and the feature 522C may be deemed significant because the wrong side of the patient is being evaluated (e.g., left-side compared to right-side). Such a different may be deemed significant (e.g., exceeding a threshold similarity value) and as such, may be flagged, for example in the determination 308, represented by the numeral 3. However, other differences may be less significant and may be omitted from the determination 308. For example, while there is a difference between the feature 522B and the feature 522C (e.g., broken compared to fractured), such a difference may not exceed a similarity threshold and may be associated with one or more preferences or stylistic choices for a physician. Accordingly, the ML service 124 may be used to illustrated that the difference is not sufficiently significant in order to prompt a determination to update or evaluate the one or more models. In this manner, systems and methods may be used to compare output determinations to determine whether or not model weights should be adjusted and/or to provide additional guidance for input prompts, among other tuning options.

Figure 6A:
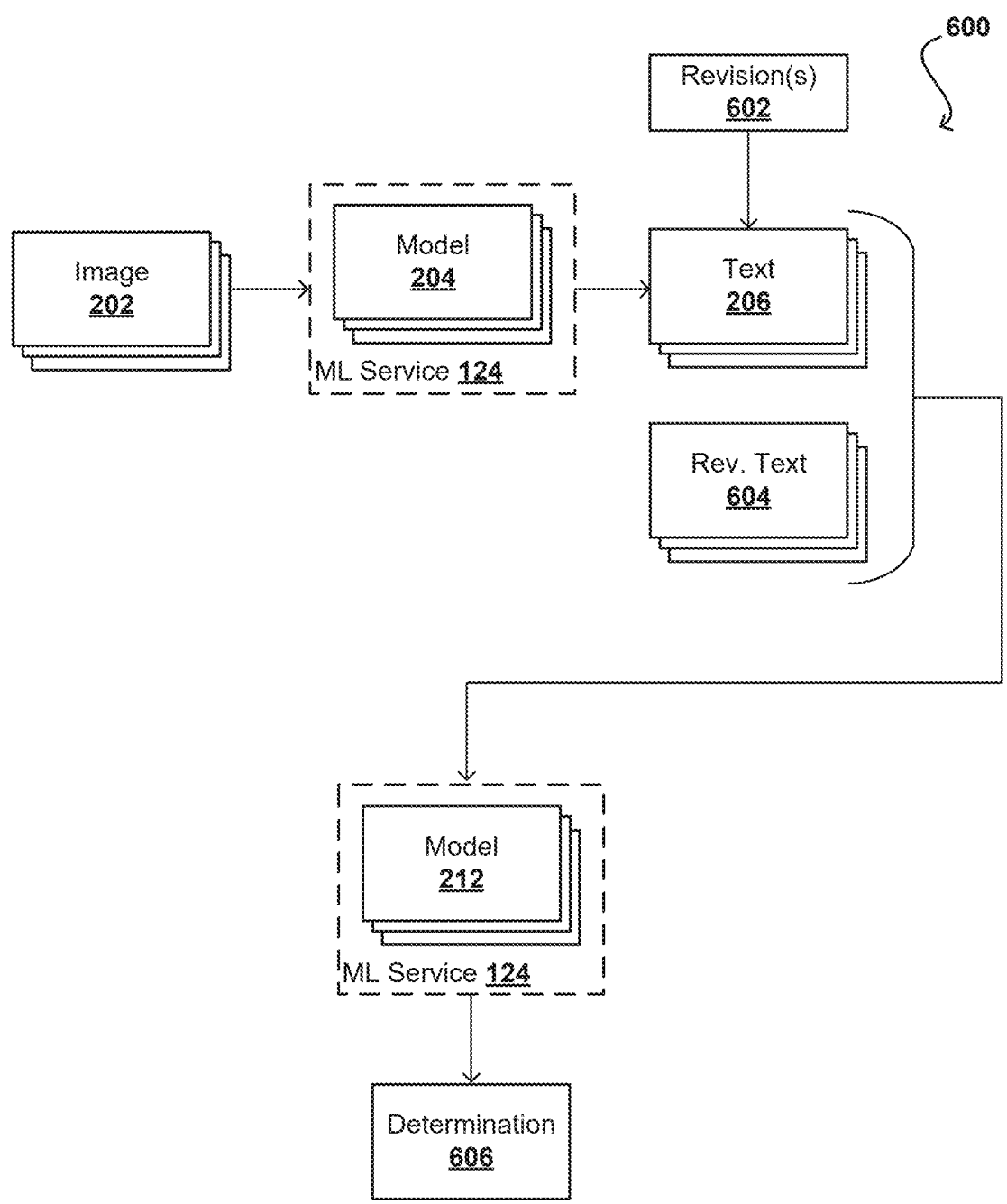
FIG. 6A illustrates an example environment for evaluating output from one or more trained models, in accordance with embodiments of the present disclosure.

FIG. 6A illustrates an example environment 200 that may be used with embodiments of the present disclosure. In this example, one or more output textual responses may be reviewed and edited by one or more human reviewers. However, the changes made by the human reviewer could be categorized as either clinically relevant or stylistic/personal. For example, a human reviewer that adds diagnostic information that was missed would be providing a clinically relevant revision. In contrast, a human reviewer that switched from active voice to passive voice would be providing a stylistic revision. When collecting information to retrain or improve models, revisions that are merely stylistic/personal may have limited value as training data, and as a result, it may be desirable to reviewer and filter human revisions in order to identify salient revisions for use with collecting information from human reviewers for retraining, tuning, or other purposes.

In this example, the input image 202 is provided to the ML service 124 for evaluation using one or more models 204, as discussed herein. The example includes an evaluation that converts an image input into the textual output 206, but other configurations may be used within the scope of the present disclosure, such as an audio-to-text conversion, a text-to-image conversion, a model-text conversion, and/or combinations thereof. The textual output 206 may be provided to a human reviewer for analysis, such as using one or more interfaces where the human reviewer can read through the text, for example with the text being displayed near the image 202, and then provide markings or suggestions for improvement and/or changes generally. One or more revisions 602 may be added to the textual output 206 to generate a revised textual output 604. As discussed herein, the revisions 602 may take many forms, such as grammatical changes, adjustments or changes to diagnostic information, adding clinical information from a physical examination, and/or combinations thereof. Accordingly, a variety of information may be added to or removed from the textual output 206 when generating the revised textual output 604.

Human-in-the-loop analysis may be useful for checking model accuracy and generating a new set of ground truth information for training and/or refinement of one or more models. For example, the human may be a healthcare practitioner that can evaluate the image 202, evaluate the textual output 206, and then provide modifications or suggestions. However, all modifications may not be clinically relevant, such as changes to grammar or tone. Systems and methods of the present disclosure may use one or more models 212, for example models within the ML service 124, to compare or otherwise evaluate the changes between the textual output 206 and the revised textual output 604. The comparison may then determine which revisions 602 are clinically relevant and then make one or more determinations 606, such as identifying the revisions 602 that should be saved as new training data.

Figure 6B:
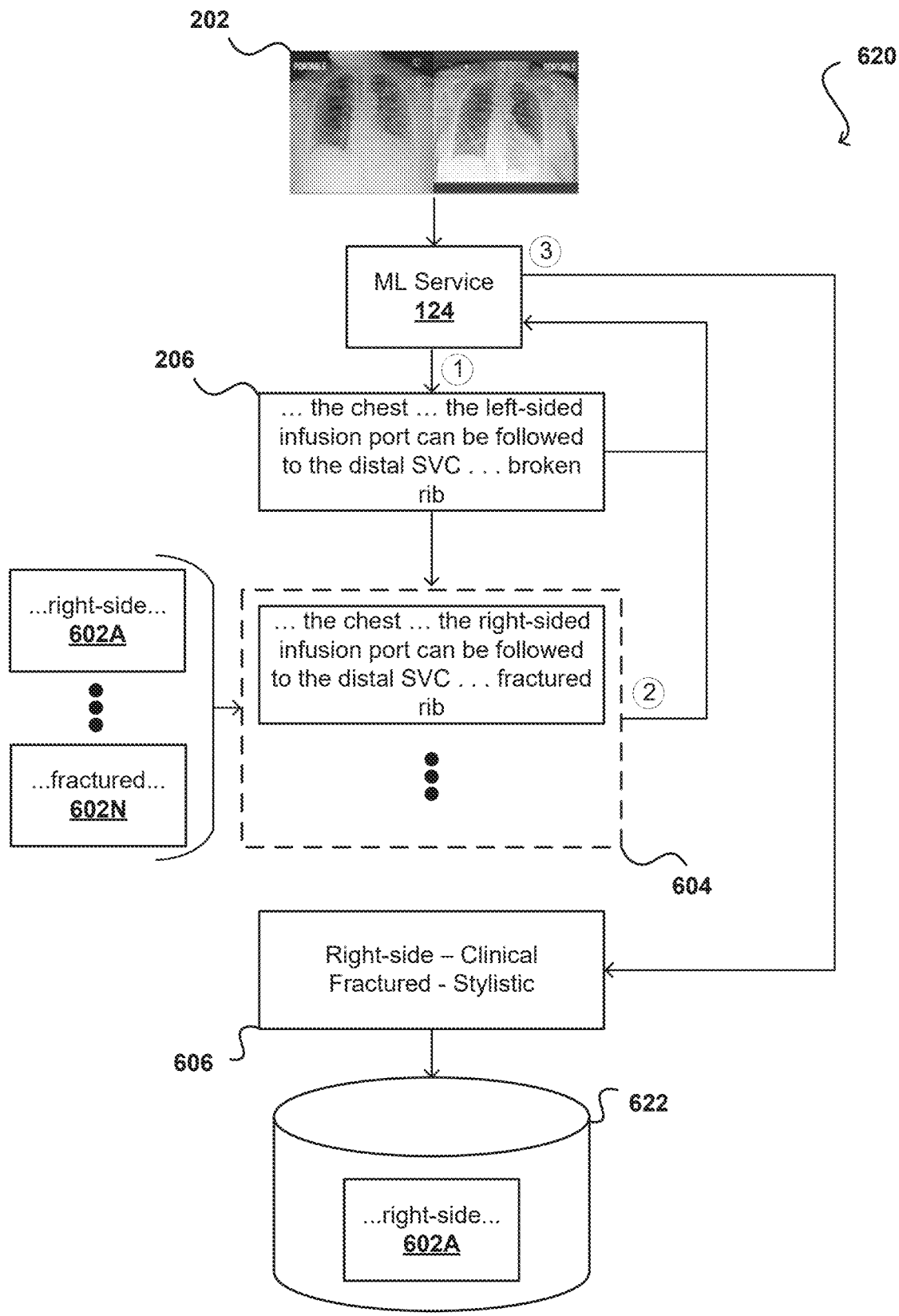
FIG. 6B illustrates an example environment for evaluating and selecting salient training data, in accordance with embodiments of the present disclosure.

FIG. 6B illustrates an example environment 620 that may be used with embodiments of the present disclosure. In this example, one or more models within the ML service 124 may be used to generate content, evaluate modifications to the content for salient changes, and then determine whether to use the changes, based on their saliency, for further training. Systems and methods may be deployed with one or more ML systems that may include a human-in-the-loop process to collect additional training data, which may be used to refine one or more models.

In this example, the input 202 includes image data, but as discussed herein, embodiments may be used with other types of input data, such as text, video, audio, and/or combinations thereof. In at least one embodiment, the ML service 124 receives the input 202 and uses one or more models, such as a VLM, to generate the output 206, as represented by the numeral 1. The output 206 may be associated with a description of content within the input 202, such as describing features within an image, identifying objects that are recognized in the image, and/or combinations thereof. In at least one embodiment, one or more revisions 602A-602N are applied to the output, thereby forming one or more revised outputs 604. The one or more revised outputs 604 may include changes to the output 206, such as corrections to certain text sequences, adjustments in grammar or tone, and/or the like. As discussed herein, certain revisions may be considered stylistic or personal, and as a result, may have reduced value for retaining or fine tuning purposes. Systems and methods may be deployed to identify the revisions and then select a subset of revisions with sufficient clinical value to generate new training data.

The revised outputs 604 may be provided back to the ML service 124, along with the output 206, to be evaluated by one or more models, as represented by the numeral 2. The one or more models may compare the text between the output 206 and the revised output 604 to determine the changes made, for example, using one or more LLMs. In at least one embodiment, the one or more models may be used to classify or otherwise categorize the changes, as represented by the numeral 3. For example, the determination 308 may assign a label or otherwise group the revisions 602A-602N. In this example, the revision 602A associated with the "right-side" is deemed a clinical change while the revisions 602B changing "broken" to "fractured" is deemed stylistic. As a result, the stylistic change may be deemed to not be clinically relevant as training data, which may lead to only the revision 602A to be added to a revised training set 622. In this manner, targeted quantities of new training data may be acquired from human reviews without including training information with limited clinical value.

Various embodiments of the present disclosure are further directed toward systems and methods for data input adjustments to provide improved inferencing outputs for one or more machine learning systems. For example, one or more embodiments may be directed toward changes and/or adjustments to initial model input information in order to change inferencing parameters to provide improved output results. One or more embodiments may be directed toward scaling and/or position encoding systems and methods in order to reduce a likelihood that fine detail is lost due to improper scaling that attempts to fit inferencing inputs to a common or generic scenario. By way of example, image information may be different depending in the medical domain based on the type of evaluation and a region of the body being evaluated. A chest, for example, is significantly larger than a wrist. However, when an X-ray is generated for a chest or for a wrist, the image data may include substantially the same number of pixels and/or inputs may be modified to fit into a set input range. Such scaling may lose information within the chest, such as fine details for smaller regions. Additionally, for various evaluations, a singular image may provide less useful information than a group of images with a known perspective. Returning to the wrist example, a top down view may not provide as much information as a side view depending on a nature of the evaluation. Accordingly, systems and methods of the present disclosure may be used to evaluate, modify, and produce refined or otherwise updated input information and/or change how input data is processed by one or more ML models. In this manner, salient information may be maintained while providing additional information that may be useful for generating improved output results, such as improved diagnostic or treatment information.

Figure 7A:
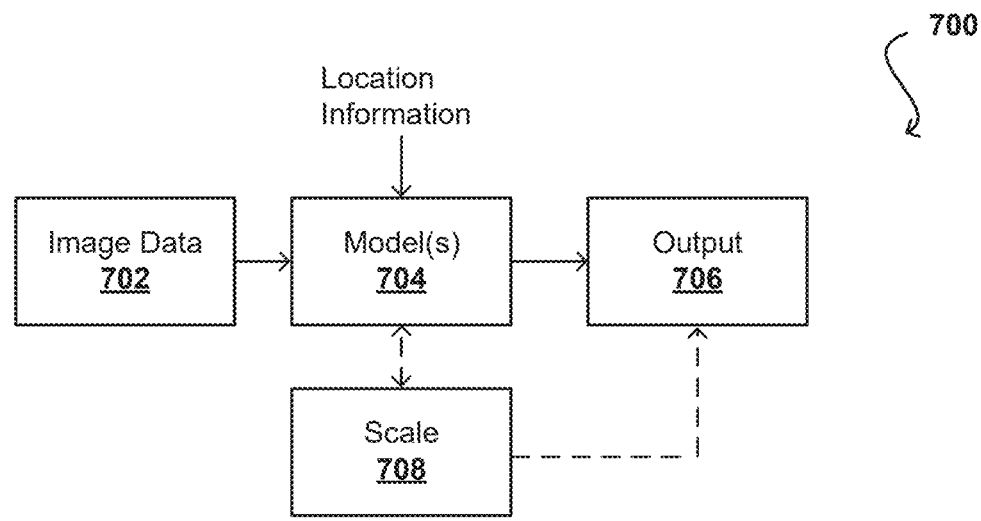
FIG. 7A illustrates a prior art image evaluation pipeline.

FIG. 7A illustrates a prior art configuration 700 for image data evaluation that uses generic scaling information for model output generation. In this configuration, image data 702 is provided to one or more trailed models 704 to generate an output 706, which may use one or more scaling engines 708 either to facilitate output generation 706 and/or to scale an resultant intermediate output of the model. As discussed herein, these methods fail to provide sufficient evaluation the image data that may be scaled such that salient information is lost. For example, scaling a chest X-ray down may lose information within different regions of the chest X-ray. As another example, scaling a wrist X-ray to be very large may add blurriness or provide unnecessary processing steps. Systems and methods of the present disclosure address and overcome these problems injecting scale information into the model, for example, by hijacking ordinality in favor of providing pixel-based size and scaling information.

Figure 7B:
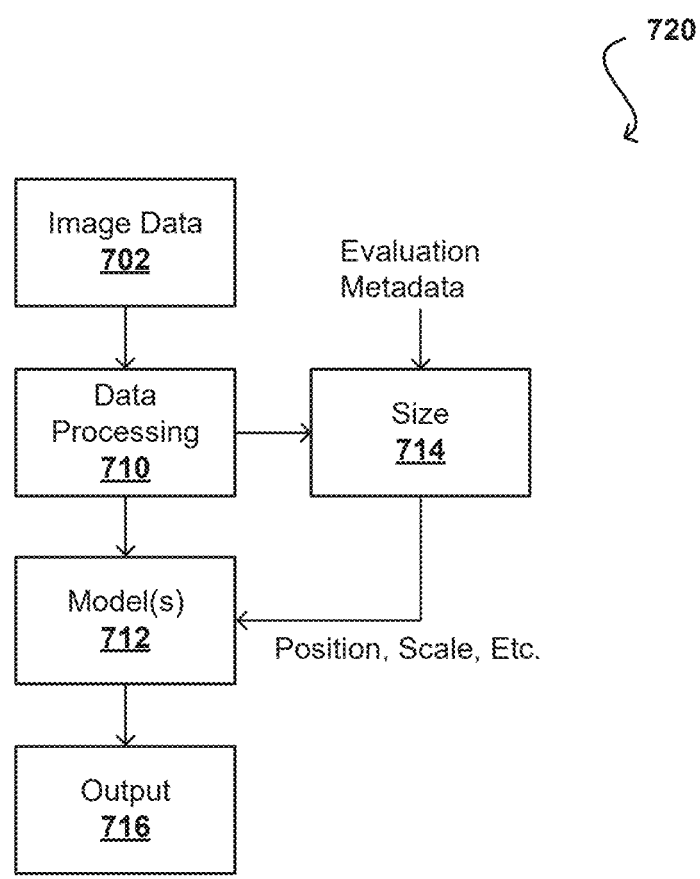
FIG. 7B illustrates an example environment for using pixel-based scaling information in an image analysis pipeline, in accordance with embodiments of the present disclosure.

FIG. 7B illustrates an example environment 720 that may be used with embodiments of the present disclosure. In this example, the image data 702 may undergo one or more data processing operations using a data processing engine 710, which may be upstream of and/or incorporated as part of one or more models 712. It should be appreciated that the one or more models 712 may be associated with the ML service 124 and the numbering used is by way of convenience and is not intended to limit the scope of the present disclosure.

In this example, the data processing engine 710 may be used to extra information from the image data 702 and/or metadata associated with the image data 720 to produce size information 714. For example, the size information 714 may be associated with pixel-based scaling information to correlate pixel distances for regions of the image data 702. The information, such as position, scale, etc. may then be provided to the one or more models 712, for example, as a type of vector and/or the like. The position information may be used, for example, to provide scale information between individual pixels and regions within the image data 702.

For example, in at least one embodiment, image data 702 may be received and then segmented or broken into different regions or patches. The one or more models 712 may not recognize the relationship between the patches absent some guiding information, such as a pre-set ordering of information. For example, an image may be broken into three rows of three columns for a total of nine pitches. The input information for the model 712 may then be configured to accept the first patch corresponding to the top left position, the second patch corresponding to the top middle, and so forth. Because the patches are segmented into consistent or standard sizes, salient information may be lost and/or otherwise not correlated to other identified regions of the image. By way of example, a distance between two anomalies may be significant, but not recognizing patch distances or relative positions may not enable the model to make such a correlation. Systems and methods of the present disclosure address and overcome these problems by determining a size of the image data 702, for example using the data processing engine 710, and then identifying pixel-based sizing information for use with model evaluation. As one example, scale information may be "injected" into the model with respect to the individual patches, thereby providing distance information in an x-y coordinate system. Additionally, scale information may refer to other relevant information, which may be one or more a spatial dimension, a temporal dimension, or other clinically relevant dimensions (e.g., patient position, patient exhale, patient inhale, etc.). Rather than identifying an object or identification within a given patch, systems and methods may correlate pixel information to patch regions, and as a result, an anomaly can be defined as being a certain number of pixels from a patch edge, which may then be correlated to a particular distance, thereby providing richer information for image analysis and diagnosis. Accordingly, embodiments of the present disclosure may be used to highjack the ordinality of the patch introduction process by adding size information, thereby preventing resizing or other techniques that may lose fine-grained detail that may provide relevant diagnostic information. In this manner, an output 716 generated by the one or more models 712 may include detailed scale information, and as a result, may provide an improved correlation between items within the image data 702 and one or more target detection schemes.

In at least one in embodiment, the scale information may be learned by the one or more models 712. For example, one or more self-learning approaches may be used to enable the one or more models 712 to identify and then tract scale information, such as on a pixel-basis. Additionally, or alternatively, systems and methods may enable the user to provide scale information to the one or more models 712. Similarly, combinations of these methods, such as a human-in-the-loop process to either provide or otherwise review scale information, may also be incorporated with various embodiments. Various embodiments of the present disclosure may consider scale information using a variety of different metrics and/or relationships. As one non-limiting example, scale can be associated with pixel to size (e.g., pixel to mm). As another example, scale may be relative to one or more other images (e.g., one pixel in image A is two pixels in image B) and/or the scale may change over different portions of the image (e.g., a top quadrant may have a different scale than a center of the image). Furthermore, scale is not limited to two-dimensional coordinates and may include a multi-dimensional representation, such as a three-dimensional (3D) scale.

Figure 7C:
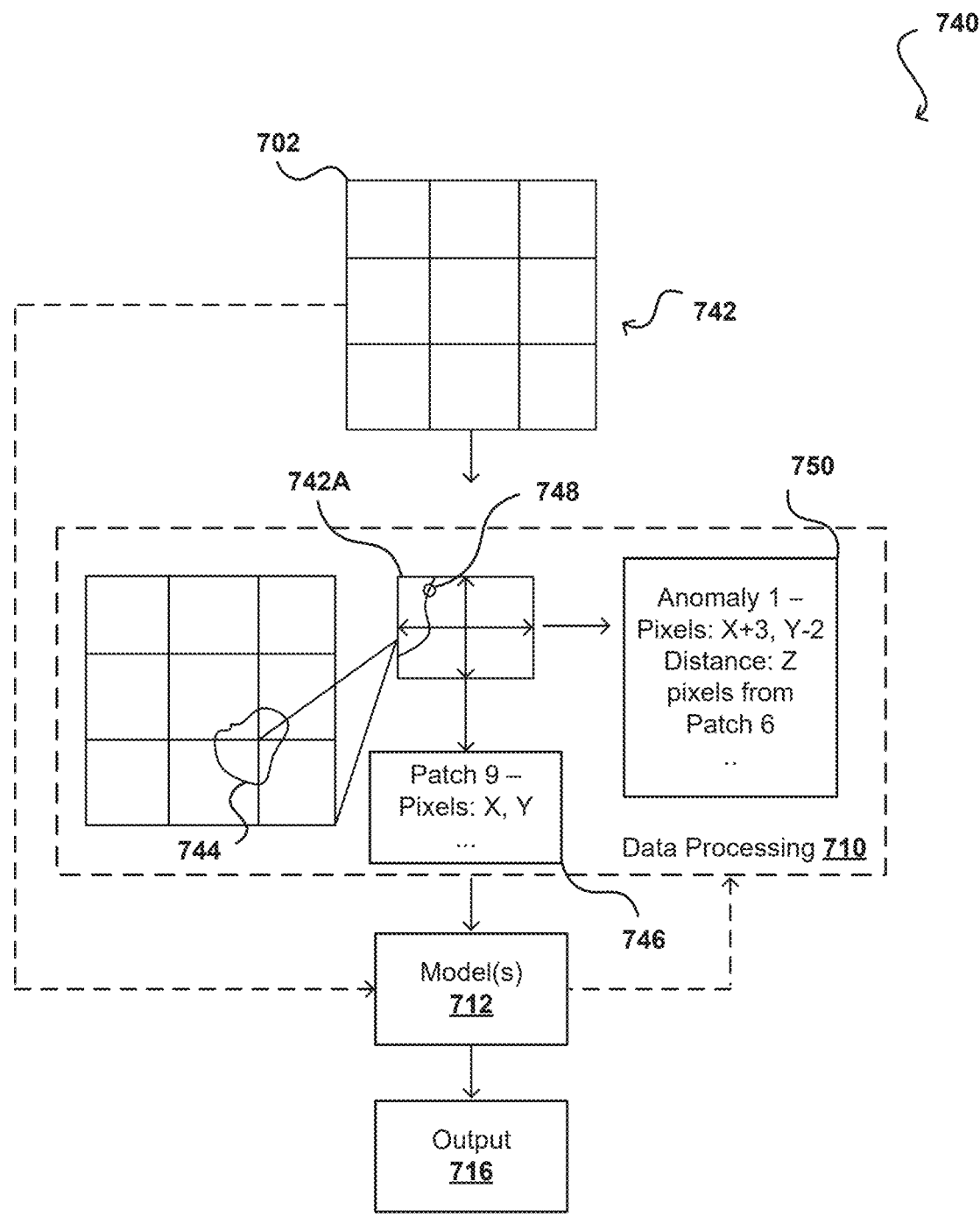
FIG. 7C illustrates an example environment for implementing pixel-based scaling with image analysis, in accordance with embodiments of the present disclosure.

FIG. 7C illustrates an example environment 740 that may be used with embodiments of the present disclosure to inject scale information into one or more models 712. In this example, the image data 702 may be divided into patches 742 and/or segments. It should be appreciated that this division may be a virtual division and/or may be a division of different pixel regions that are separately provided to the one or more models 712. The patches 742 of the example in FIG. 7C are shown to be the same size, but various embodiments may use differently sized patches based on different processing configurations. For example, certain regions may be considered a focal point or emphasis area, and as a result, those regions may include more or fewer patches. Similarly, cropping may be used to reduce a total number of patches provided to the one or more models 712.

One or more embodiments may include the data processing engine 710 to receive the image data 702 and/or additional information, which may be information provided by the user, such as metadata associated with the image data 702, and/or information extracted from the image data 702 by the one or more models 712, as well as combinations thereof. For example, the one or more models 712 may be trained to determine a size of the image, determine a region of the image, determine one or more properties of the them, and then provide information to the data process engine 710 to facilitate pixel-based sizing or otherwise techniques to better utilize the image data 702.

As shown, the image data 702 may include one or more regions of interest 744 that are spread across a plurality of patches 742. The patches 742 in this example divide the image data 702 into nine equal portions, but there may be more or fewer patches as discussed herein. In at least one embodiment, a particular patch 742A, which in this example corresponds to Patch 9 at the bottom right corner of the image data 702, may be processed to identify patch pixel information 746. For example, pixel information for the particular patch 742A and the portions therein may be identified and associated with the patch 742A. As discussed herein, pixel information may provide multi-dimensional information that may be used at inference to generate a variety of relationships and/or correlations. By way of example, pixel information may be associated with one or more of a spatial dimension, a temporal dimension, or a clinical dimension. For example, pixel information may be used to supply x-y-z coordinates, time, patient status (e.g., inhale, exhale, etc.). Thereafter, one or more particular portions 748 may me associated with portion information 750, which may be used to identify pixel-based positions for the regions of interest 744. For example, the portion information 750 not only provides pixel-based sizing for the portion 748, but also provides distance information with respect to the remaining patches, such as the Patch 6 (e.g., the patch directly above the Patch 9). Accordingly, systems and methods of the present disclosure may inject pixel-based sizing information into the one or more models 712 to provide the outputs 716.

Various embodiments of the present disclosure may also be directed toward systems and methods to provide position codes for coordinates within the image data 702, which may be associated with or separate from the pixel-based scaling operations. In at least one embodiment, position codes are used to address and overcome problems with current implementations that map different coordinates to a table and then a look up operation is performed to try and correlate diagnostic information for different positions within an image. Present techniques suffer from the same scaling problems, among others, that may be addressed using embodiments of the disclosure with respect to pixel-based scaling. Furthermore, systems and methods may be used to establish a consistent scale between input images, for example based on a tunable parameter. Scale information may then be fed into the system as a parameter for consideration by the model during inference. For example, the scale information may be provided as part of the size information 714 discussed herein. As a result, the one or more models 712 may not be changed, but input information may be adjusted in accordance with different outcomes and/or desired operating conditions.

Figure 8A:
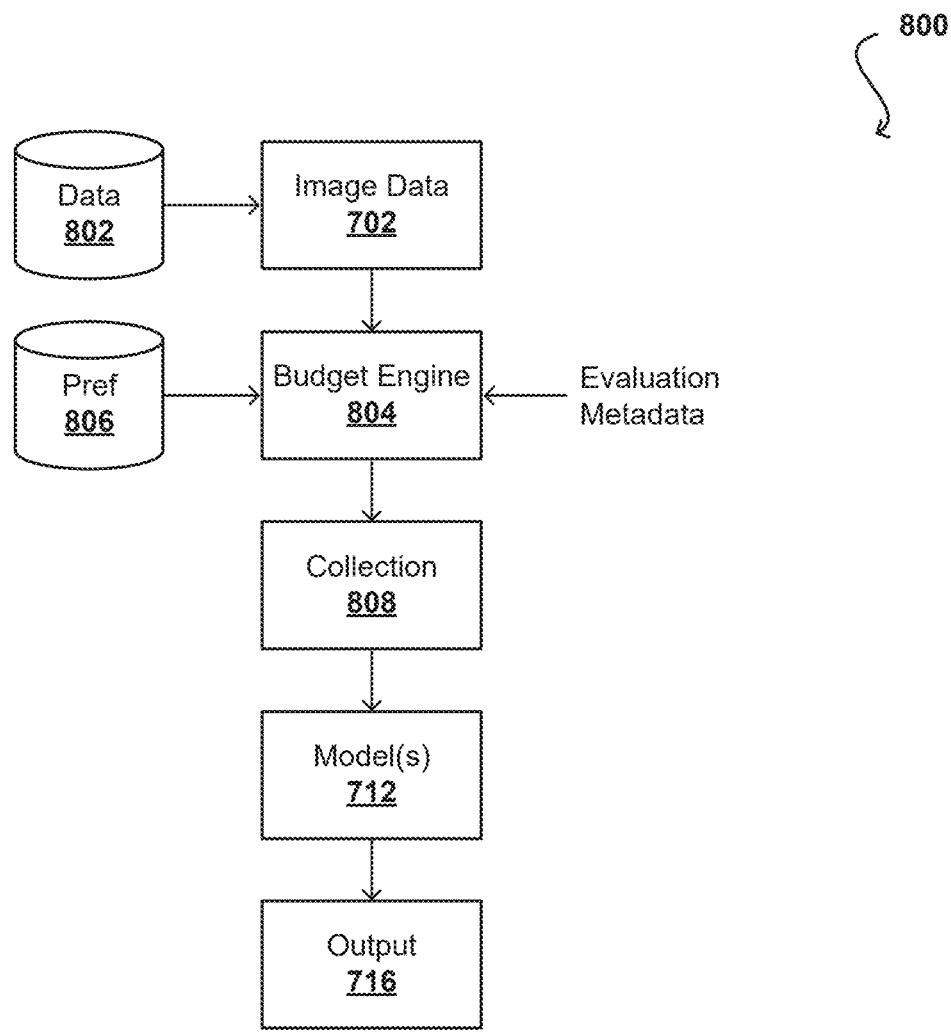
FIG. 8A illustrates an example environment for using budgeting metrics to batch model inputs, in accordance with embodiments of the present disclosure.

FIG. 8A illustrates an example environment 800 that may be used with embodiments of the present disclosure. In this example, systems and methods of the present disclosure may be used to dynamically adjust image length and batching to improve a set of input data for processing using one or more models. Accordingly, embodiments may overcome problems with existing techniques that fail to recognize that image data may have different lengths (e.g., more or fewer pixels) and instead attempt to resize and form each image into a common length. Often, the standard image size is insufficient for particular diagnostic purposes and disregards key information within the image data, which may lead to poor outcomes because salient features may be improperly scaled and/or the like. Various embodiments may address and overcome this problem by establishing a "budget" for different patch sizes and adjusting the budget based on the initial input size and/or diagnostic properties. As a result, images may be batched according to the initial image size and then processed together during training and inferencing. For example, a vector may be used to add tags to input information to differentiate between views, patients, diagnostic intent, etc.

In this example, image data 702 is obtained for processing using the one or more models 712. As discussed herein, the image data 702 may come from one or more image datastores 802, for example with information that is collected from a number of different patients and/or as training data, among other options. With traditional systems, the image data 702 may be resized into a standard input size for the given models 712. For example, the image data 702 may be enlarged or compressed, or in cases where the image data is a different scale, may be stretched or otherwise modified to fit within the standard input size. Such modifications may provide for easier processing, but may lose rich information within the image data. For example, compressing a chest X-ray may lose some of the granular detail, which may be key information for diagnostic purposes. Embodiments of the present disclosure may address and overcome this problem by identification image data information and then dynamically adjusting image sizes, and as a result the input parameters, based on diagnostic information for the images.

One or more embodiments may include a budget engine 804 that may be used to evaluate the image data 702 according to one or more preferences from a preference datastore 804 and/or based on evaluation metadata, such as metadata specific to the image data 702. By way of example, the image data 702 may correspond to a plurality of images that each have a common input size, such as a series of chest X-rays. The evaluation metadata may be used to provide information regarding the image data 702, such as the type of evaluation to be performed, non-personally identifying tag information for the image data 702, and/or the like. Similarly, the budget engine 804 may also process the one or more preferences from the datastore 806 to determine one or more particular features or configurations for the image data 702. For example, X-rays may be processed different than CT scans. As another example, X-rays for the purposes of lung evaluation may be different than X-rays to look for broken bones. In this manner, different information may be tagged and then a collection engine 808 may be used to aggregate and batch images based on the preferences and/or the evaluation metadata. For example, a set of images may be batched so that all chest X-rays are processed together and then a second set of images may be batched so that all wrist X-rays are processed together. In this manner, systems and methods may avoid or resizing or scaling of images based on the ordering of the data, and instead, may base batching and processing on the preferences and/or evaluation metadata.

In at least one embodiment, a given budget may be established based on an initial image size. For example, a first image may be a particular sizes and it may be determined that any images larger than the first image would need to be scaled down, and as a result, may be batched with a different set of images. Such information may be based, at least in part, on the preferences from the datastore 806, which may use one or more machine learning models to evaluate and coordinate batching for the process. Additionally, budgets may be modified based on diagnostic properties. For example, it may be determined that a wrist X-ray, by itself, provides less cumulative diagnostic information than a series of wrist X-rays, even if the X-rays are all of different sizes. Accordingly, systems and methods may implement rules to change budget sizes to collect and aggregate information based on desired diagnostic preferences, for example from the datastore 806. In this manner, the collection engine 808 may be used to collect and aggregate information for the one or more models 712 to generate the outputs 716.

Figure 8B:
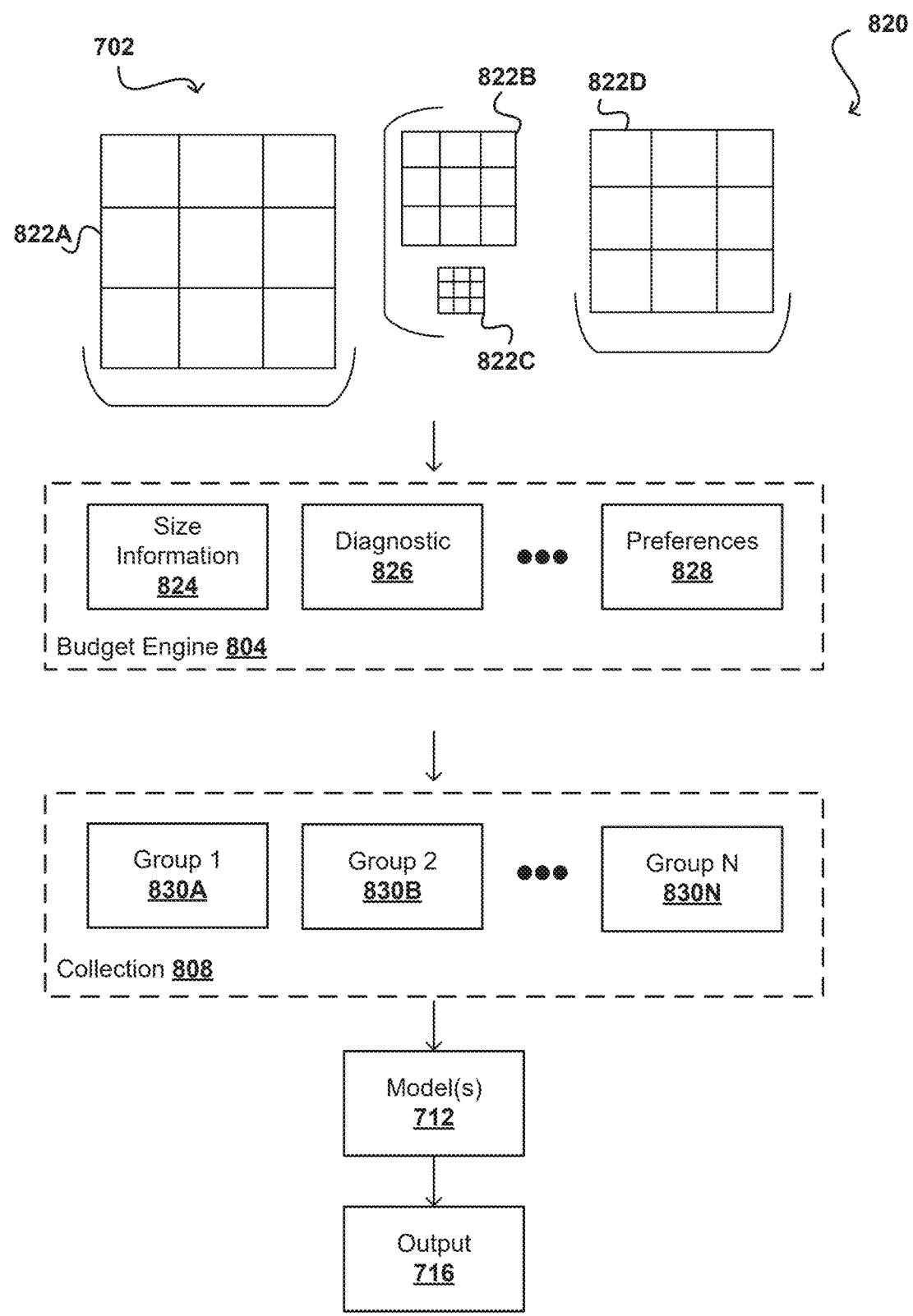
FIG. 8B illustrates an example environment for batching model inputs, in accordance with embodiments of the present disclosure.

FIG. 8B illustrates an example embodiment 802 for establishing a budget and then batching/collecting input image data for processing using one or more ML models. In this example, different image data 702 is provided where individual images 822 may have different sizes and/or other properties. For example, the image 822A is larger than each of the images 822B-822D. If the standard input size for the one or more models 712 were set to be equal to, for example, the image 822B, then other images would need to be resized, which could distort image data and/or lose granularity that may be helpful in analysis and overall diagnosis. Embodiments of the present disclosure may be used to identify input image data, establish a budget for the data, and then use one or more preferences to dynamically adjust input lengths based on one or more diagnostic criteria.

The budget engine 124 may receive and evaluate the input image data 702. For example, the budget engine 804 may be configured to extract and/or receive one or more of size information 824, diagnostic information 826, and/or preferences 828. The size information may be directed toward an overall size of the image, the size of the individual patches of the image, and/or combinations thereof. In at least one embodiment, images may be associated with a collection or group such that an image may be tagged as the primary image and budgeting decisions may be based on the primary image. For example, a chest X-ray may be provided with additional imaging data for more targeted areas, such as just the right lung, just the left lung, etc. The size information may then provide the initial chest X-ray as the maximum image and other images smaller than the chest X-ray may be batched for further processing.

In at least one embodiment, the diagnostic information 826 may be associated with a diagnostic evaluation associated with the image data. As discussed herein, X-rays taken of a joint may be more useful is acquired from several different perspectives, as opposed to just one. Systems and methods may then use this information to batch or collect information within a single group, such as batching the images 822B, 822C. The preferences information 828 may be one or more tunable parameters from a user of the system. For example, maximum or minimum lengths may be specified, tag preferences may be specified, and/or the like. This information may then be used by the collection engine 818 to establish different groups 830 for processing by the one or more models. For example, a first group 830A may include the image 822A and because the smaller images were not used to control sizing, the image 822A may be segmented and processed by itself. Similarly, a second group 830B may include the images 822B, 822C to be collectively analyzed for a singular diagnosis over a region. Further groups may be established and then used by the one or more models 712 to generate the different outputs 816.

Figure 9:
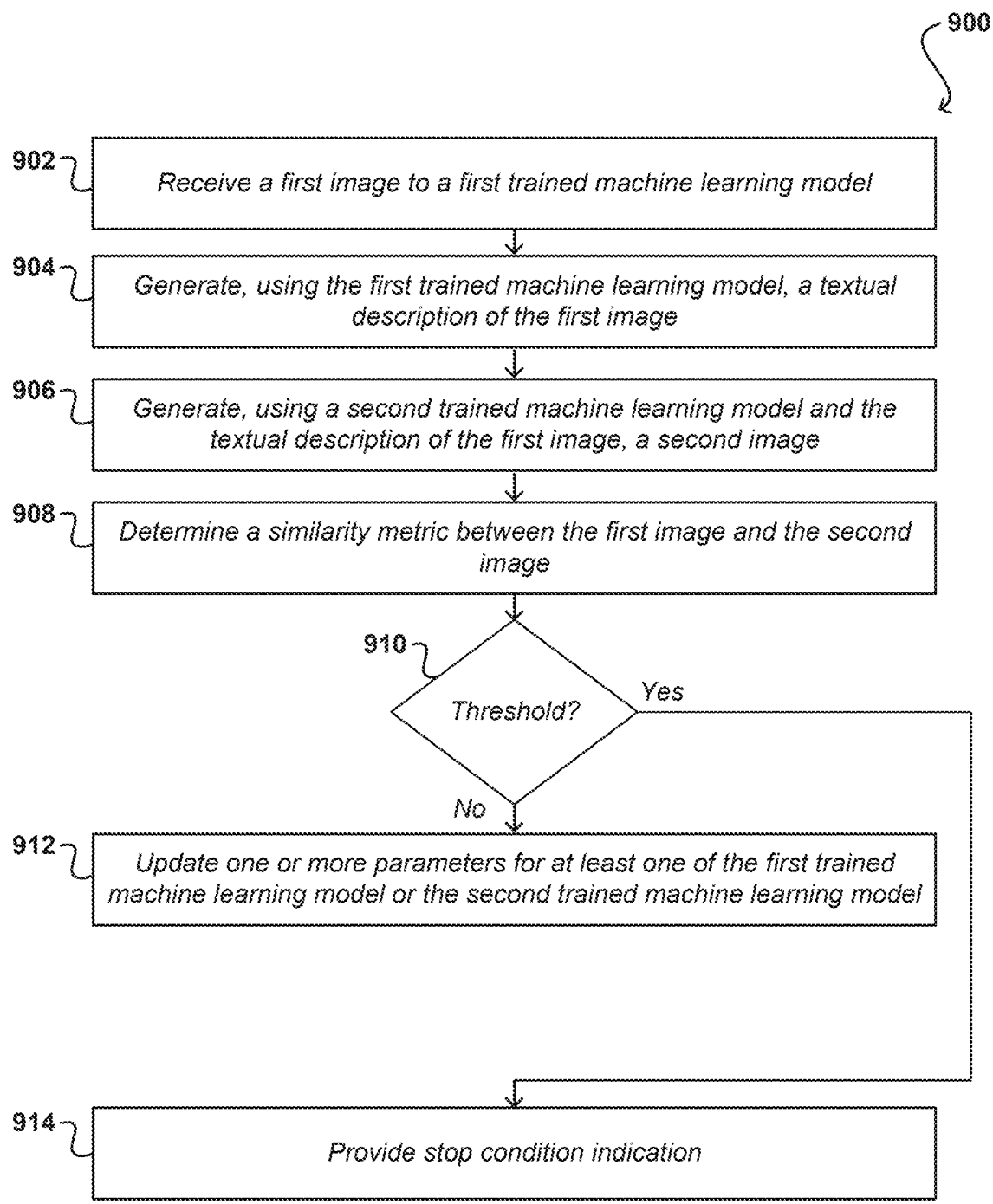
FIG. 9 is a flow chart of a process for evaluating a similarity metric between model outputs, in accordance with embodiments of the present disclosure.

FIG. 9 illustrates an example flow chart for a process 900 for evaluating a model accuracy output. It should be appreciated that steps for the method may be performed in any order, or in parallel, unless otherwise specifically stated. Moreover, the method may include more or fewer steps. In this example, a first image to received to a first trained machine learning model 902. As discussed herein, the model may be on or more systems, such as an VLM, that may be used to analyze one or more features of the image. Additionally, systems and methods may incorporate multiple different models that are used to analyze different features of the first image, such as a first model for segmentation, a second model for classification, and/or the like. In at least one embodiment, a textual description of the first image is generated using the first trained machine learning model 904. For example, if the first trained machine learning model were a VLM, the first image may be provided and a prompt and/or instructions for the model may be to generate a textual description associated with one or more portions of the first image. In at least one embodiment, the textual description may be tuned to a specific domain, such as a medical domain.

A second trained machine learning model may then be used to generate a second image using at least a portion of the textual description 906. For example, a diffusion model may receive prompt information associated with the textual description to generate one or more new images. Additionally, various other image generation models may also be used. The second image may then be evaluated against the first image to determine a similarity metric 908. As one example, a discriminator may evaluate both the first and second images to determine differences between the images and then assign a similarity metric or score. The score may then be compared against one or more thresholds 910. For example, if the similarity metric or score was below a threshold or outside of a range, then one or more parameters for one or more of the models may be updated 912. The updated parameters may be stored, for example during a training process, or may be used to generate additional images and/or text (or other modalities) in a repeated process until one or more stop conditions are satisfied. The updated one or more parameters may then be stored or may be discarded. However, if the similarity metric or score was to exceed the threshold, then an indication may be provided, such as an indication that a stop criteria is satisfied 914. In this manner, model accuracy may be evaluated by determining whether the original textual description provided sufficient information to generate a substantially similar image.

Figure 10:
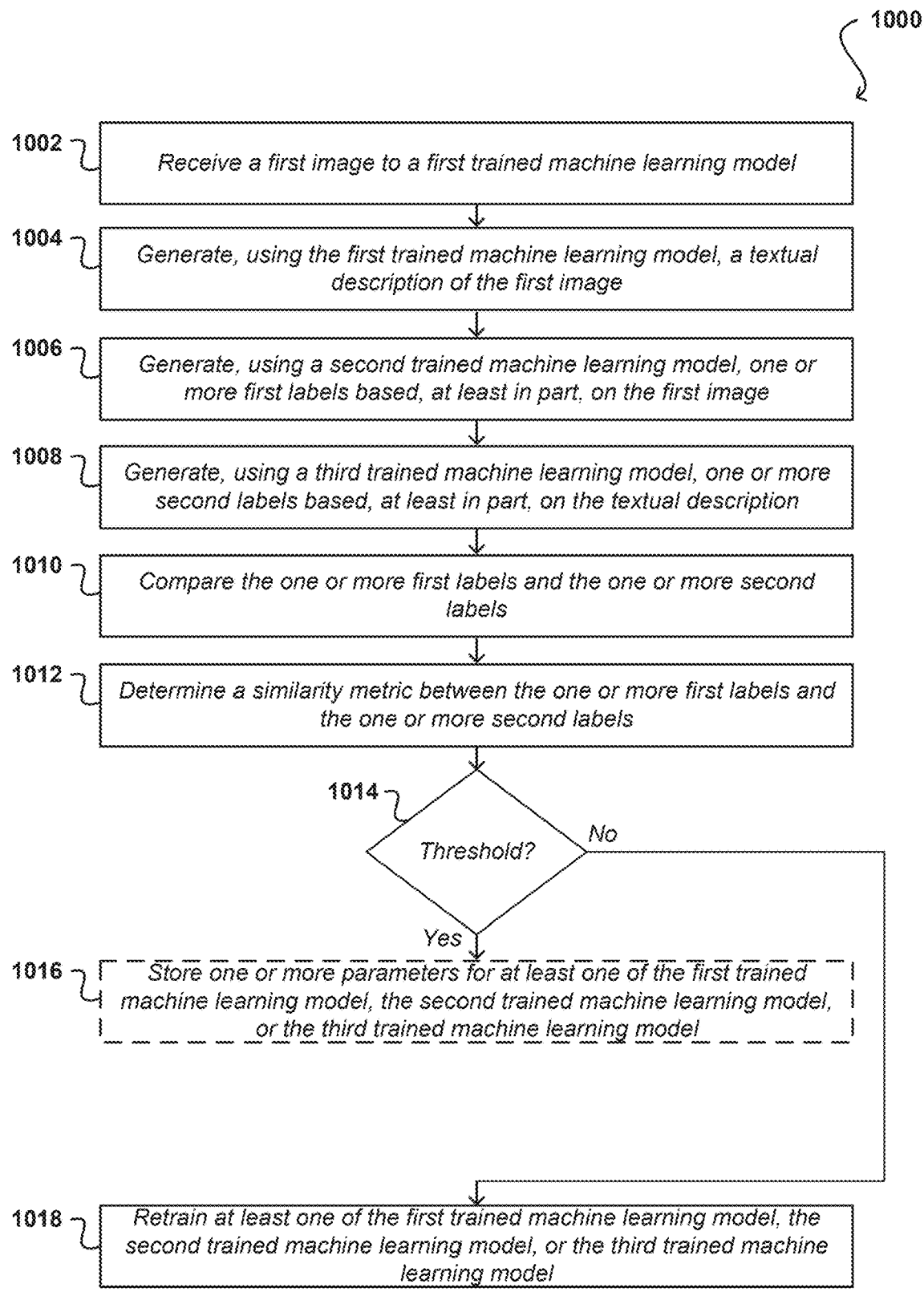
FIG. 10 is a flow chart of a process for evaluating a similarity metric between model outputs, in accordance with embodiments of the present disclosure.

FIG. 10 illustrates an example flow chart for a process 1000 for evaluating a model accuracy output. In this example, a first image may be received at a first trained machine learning model 1002, as discussed herein. The first image may be provided as an input to one or more models that are used to generate a textual description of the first image 1004. For example, the model may describe or identify one or more regions within the first image. A second trained machine learning model may then be used to generate one or more labels for the first image 1006. For example, a classifier may be used to evaluate portions of the first image and output a set of labels for items within the first image. A third trained machine learning model may further be used to generate one or more second labels from the textual description 1008. In at least one example, the third trained machine learning model is an LLM that may be used to identify certain words or categories within the textual description.

In at least one embodiment, the first and second labels may be compared 1010, for example by evaluating two different output lists. A similarity metric may be determined for the comparison 1012. In at least one embodiment, the similarity metric may evaluate duplicate items between the two sets of labels, missing items between the two sets of labels, and/or combinations thereof. It may then be determined whether or not the similarity metric exceeds a threshold 1014. If so, then one or more parameters for one or more of the models may optionally be stored 1016, for example during a training process. If the process is performed during inference, however, then exceeding the threshold may provide an option to a user to accept the results and/or perform the process a second time. However, if the similarity metric or score is below a threshold, then one or more of the models may be retrained 1018. Retraining may be a full retraining process, for example during training, or may be incremental training performed at inference. In this manner, model accuracy may be evaluated by determining whether the original textual description identified a sufficiently similar number of items of interest in the image.

Figure 11:
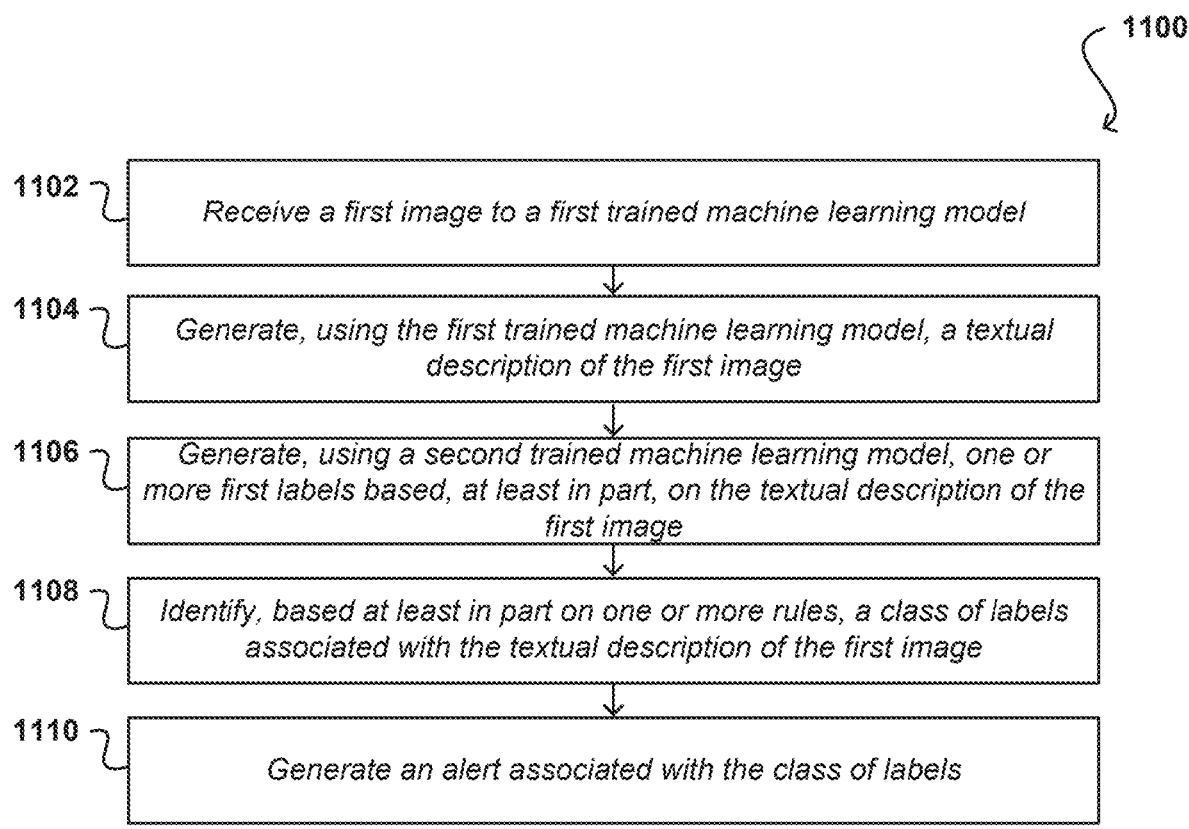
FIG. 11 is a flow chart of a process for generating an alert for a detected class of labels from a model output, in accordance with embodiments of the present disclosure.

FIG. 11 illustrates an example flow chart for a process 1100 for generating an alert based on a detected salient feature or feature combination. In this example, a first image is received at a first trained machine learning model 1102 and used to generate a textual description of the first image via one or more trained machine learning models 1104. In at least one embodiment, a second trained machine learning model may be used to generate one or more labels from the textual description 1106. For example, an LLM may evaluate the text and generate a list of terms or phrases that are associated with one or more domains. A class of labels may be identified within the one or more labels 1108. In at least one embodiment, the class of labels may be a predetermined class for a particular domain, such as a medical domain. For example, systems and methods may include a set of classes that provide a high risk for a particular ailment or complication, and as a result, the set of classes may include pairs of words or phrases found in a common list, as discussed herein. When the class of labels are identified an alert may be generated 1110, which may provide an indication that prompt intervention is desirable.

Figure 12:
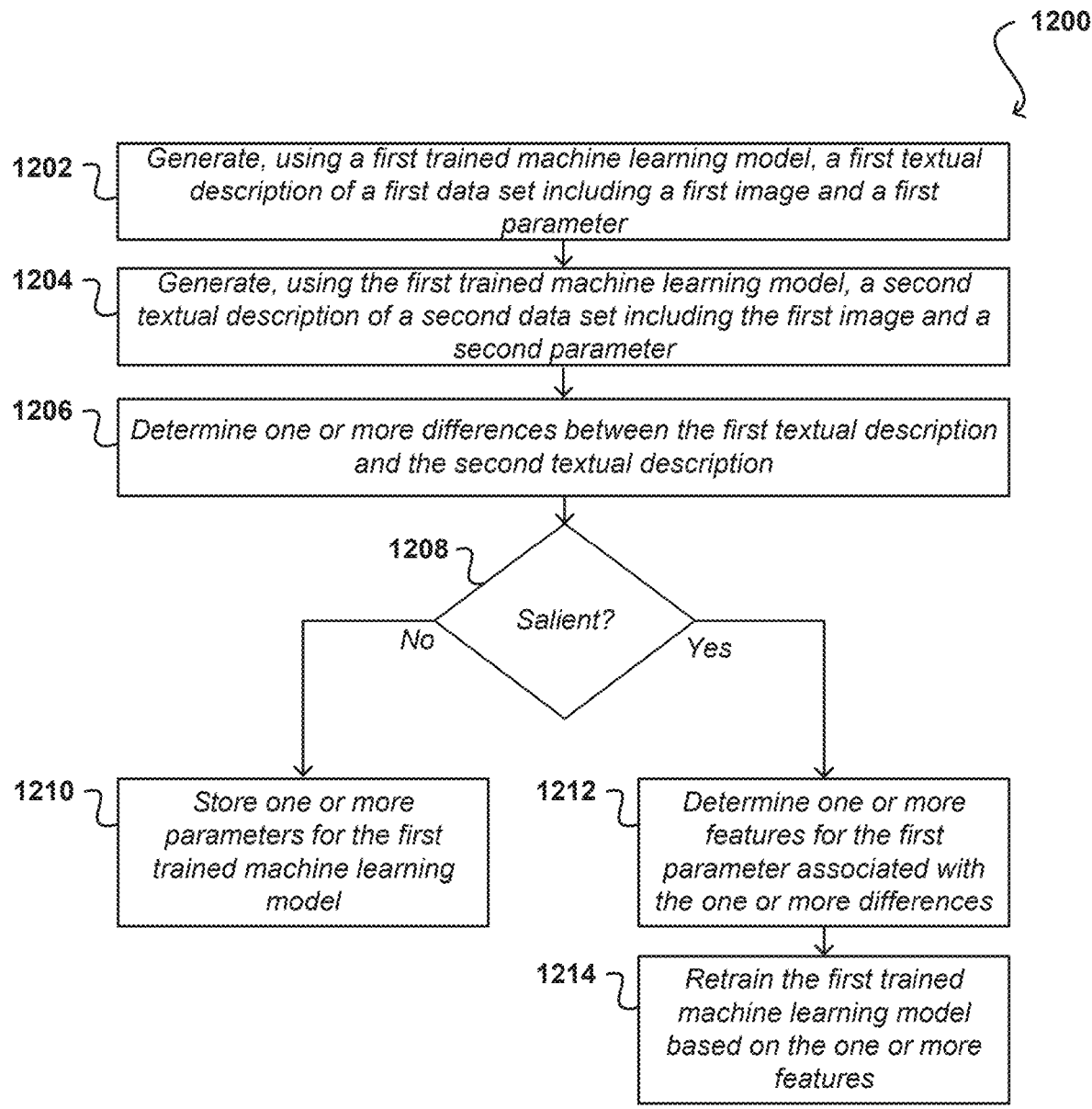
FIG. 12 is a flow chart of a process for evaluating a set of model outputs based on input parameters, in accordance with embodiments of the present disclosure.

FIG. 12 illustrates an example flow chart for a process 1200 for identifying hallucinations with model outputs. In at least one embodiment, a first textual description is generated for a first data set using a first trained machine learning model 1202. The first data set may include a first image and a first parameter. The first parameter may be particularly selected from a set of parameters that are not considered clinically-relevant and/or that are determined to have a low likelihood of affecting an output diagnostic analysis. By way of example, a time of day to evaluate an image should not affect the quality or output of the evaluation.

A second textual description may be generated for a second data set using the first trained machine learning model 1204. In at least one embodiment, the second data set uses the same first image but a different second parameter. The second parameter, much like the first parameter, may be selected from a set having a low likelihood of affecting a clinical evaluation associated with the first image. One or more differences may be determined between the first textual description and the second textual description 1206. For example, an overall diagnosis, particular findings, words, phrases, tone, and/or the like may be evaluated. It may be determined whether or not differences are salient 1208. For example, a salient difference may include a different diagnostic decision. As another example, a salient difference may include an additionally identified or missed abnormality. In contrast, a non-salient difference may be an order in which the information is presented or sentence structure.

If the differences are not salient, then the one or more parameters may be stored 1210. Non-salient differences may be indicative of a model that is not relying on the non-salient information when generating the response, which is a desirable outcome and illustrates the model has learned which input features are relevant for analysis. However, if the differences are determined to be salient, one or more features for the first parameter associated with the one or more differences may be determined 1212. For example, the feature may be associated with a time of day, day of the week, or other information. By identifying the features of the parameter that are being used in the model determination, systems and methods may then retrain the first model 1214. In this manner, hallucinations may be reduced by identifying and focusing in on areas or features that model is erroneously using.

Figure 13:
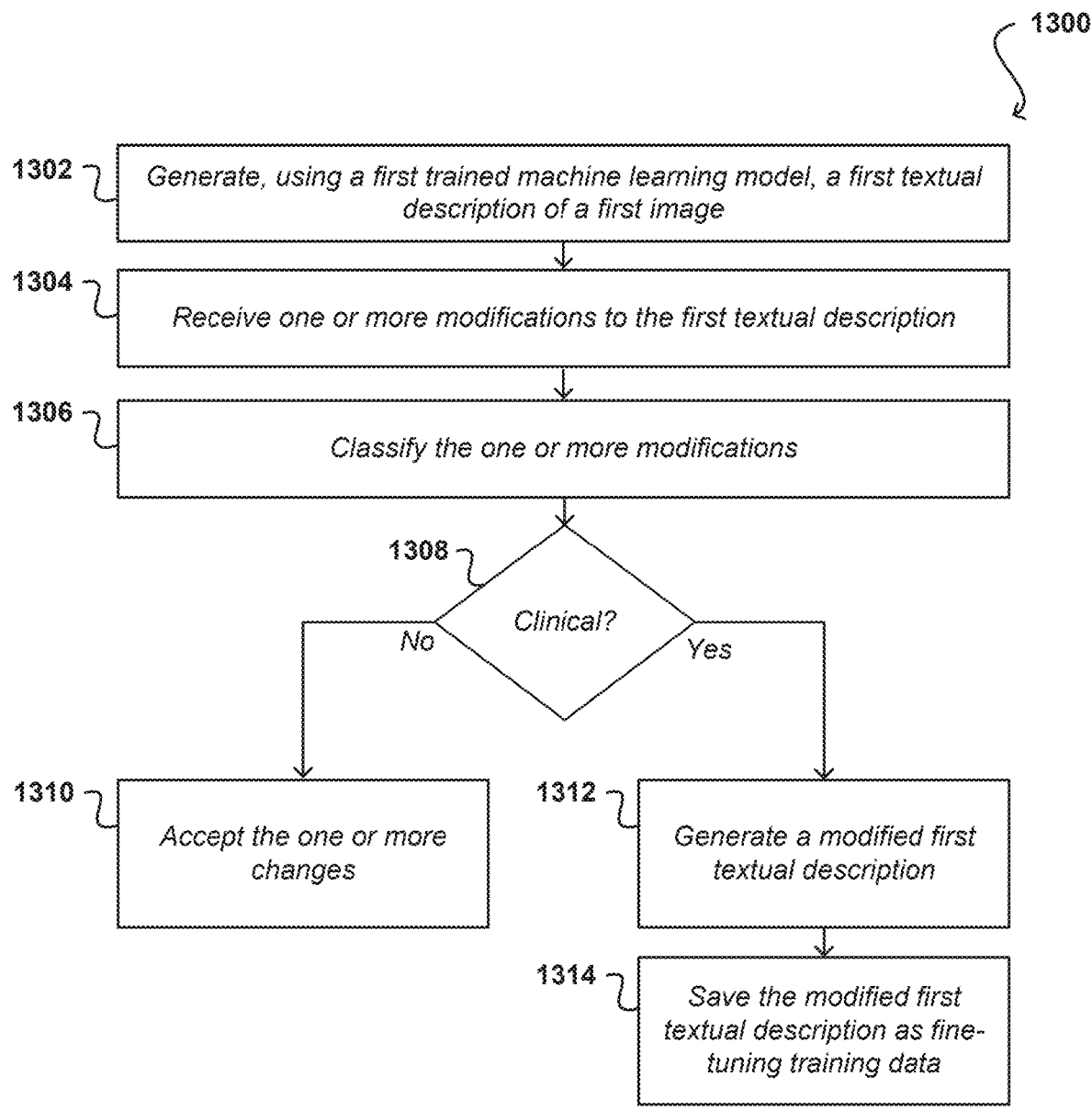
FIG. 13 is a flow chart of a process for determining salient training information, in accordance with embodiments of the present disclosure.

FIG. 13 illustrates an example flow chart for a process 1300 for identifying clinical changes from a human reviewer to supplement training data. In this example, a first textual description for a first image is generated using a first trained machine learning model 1302. In at least one embodiment, the textual description may be provided to a human reviewer for analysis, modification, and/or the like. For example, in the domain for medical evaluation, it may be desirable to have a machine system perform an initial analysis that is reviewed and augmented by a human reviewer, such as a trained physician. However, human reviewers may a provide stylistic or personal changes that are not relevant to the generation of the model output, and as a result, would provide limited benefit for retraining or fine tuning. For example, one or more modifications may be received for the first textual description 1306 and the one or more modifications may be classified 1308. It may be determined whether or not the one or more modifications are clinical 1308. If not, the changes may be added to the description, but the description itself may not be saved for further training. However, if the one or more modifications are clinical, a modified first textual description may be generated 1312 and saved as further training data 1314. Accordingly, training data may be targeted to focus on clinical evaluations instead of stylistic or personal preferences.

Figure 14A:
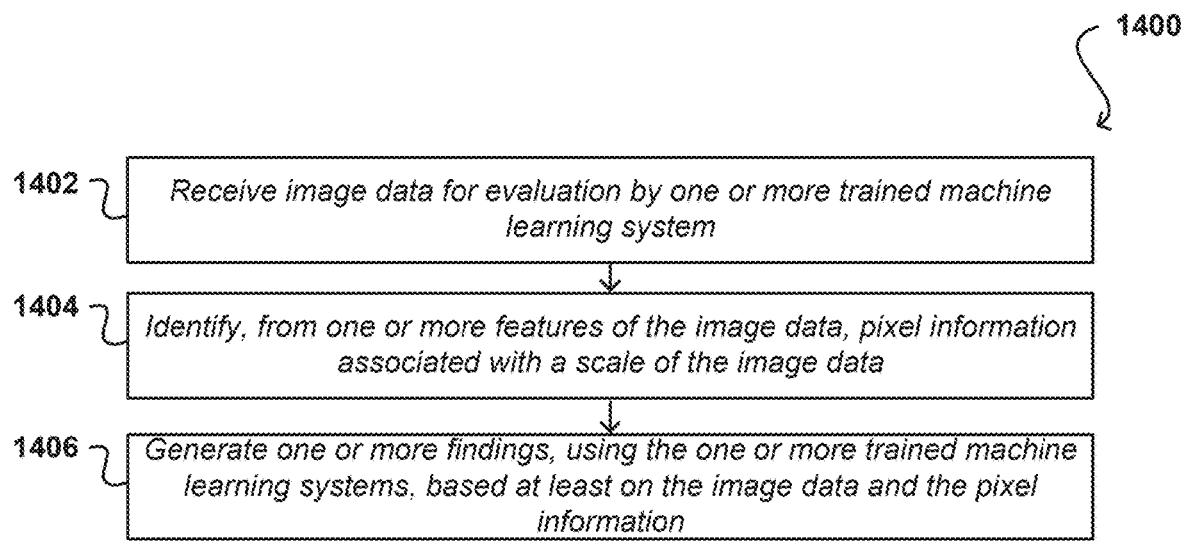
FIG. 14A is a flow chart of a process for pixel-based scaling image analysis, in accordance with embodiments of the present disclosure.

FIG. 14A illustrates an example flow chart for a process 1400 for using pixel-based scaling for inferencing operations. In this example, image data is received for evaluation by one or more trained machine learning systems 1402. The image data may include one or more pixels, which may be associated with a size of the image. In the non-limiting example of medical images, images may be different sizes based on the body part being evaluated and/or a desired goal of the evaluation. Pixel information for one or more features of the image data may be identified 1404. In at least one embodiment, the pixel information may be associated with a scale of the image data. That is, pixels may be correlated with different locations within regions of image data, and as a result, even if the overall image data is segmented or patched, reference information based on pixels, rather than on image sizes, may be used to correlate findings. As discussed herein, pixel information may also refer to other types of information that may be used in addition to, or in place of, the scale information, such as different dimensional, temporal, or clinical data. In at least one embodiment, the pixel information may be introduced as inference to generate one or more findings 1406.

Figure 14B:
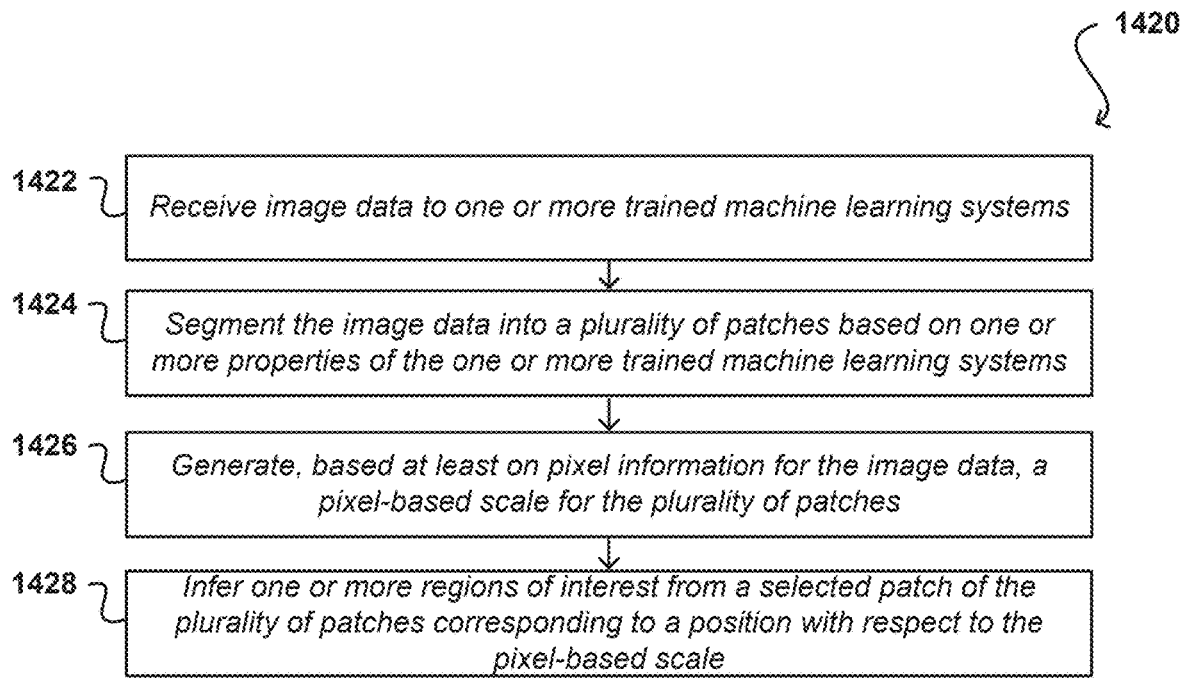
FIG. 14B is a flow chart of a process for pixel-based scaling image analysis, in accordance with embodiments of the present disclosure.

FIG. 14B illustrates an example flow chart for a process 1420 for pixel-based scaling for inferencing operations. In this example, image data is received 1422 and segmented into a plurality of patches 1424. The patches may be used to reduce a large image into a set of management chunks or segments. In at least one embodiment, the segments are indexed and/or provided to a trained machine learning system in a certain order to maintain some sort of dimensionality. However, as discussed herein, the patches may be screwed or otherwise modified due to the set image data size of most systems, thereby potentially obscuring relevant information, such as by increasing a sizes such that features are blurred or reducing a size so much that granular features so no-longer readily visible. Systems and methods of the present disclosure may generate pixel-based scale information for the plurality of patches 1426 to correlate pixel size and location to different features and patches. One or more regions of interest may then be inferred from a selected patch using the pixel-based scale information as a reference for the one or more regions of interest to the remaining patches 1428.

Figure 15A:
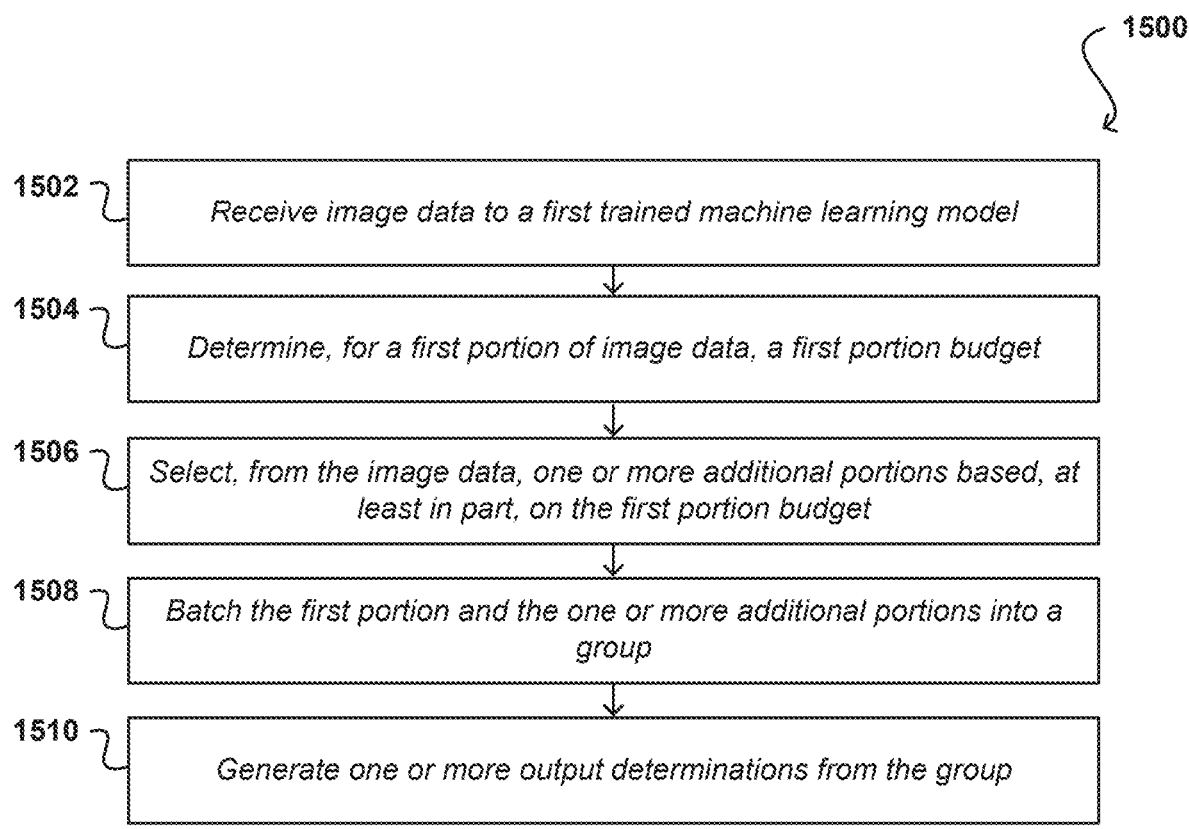
FIG. 15A is a flow chart of a process for model input data batching, in accordance with embodiments of the present disclosure.

FIG. 15A illustrates an example flow chart for a process 1500 for input data batching. In this example, image data is received to a first trained machine learning model 1502 and a first budget is determined for at least a first portion of the first image data 1504. As discussed herein, the budget may refer to an image size or the like associated with the image, where a large initial image may allow for lager subsequent images, for example to account for a sequence of images for a larger region, while a small initial image may have a smaller budget indicative of wanting to batch larger images separately to avoid resizing beyond a threshold amount. One or more additional portions of the image data may be selected using the budget 1506 and then the first portion and the additional portions may be batched 1508 and used to generate one or more output determinations 1510. As a result, data may be efficiently batched to reduce resizing of images and/or to collect groups associated with a similar diagnostic purpose together.

Figure 15B:
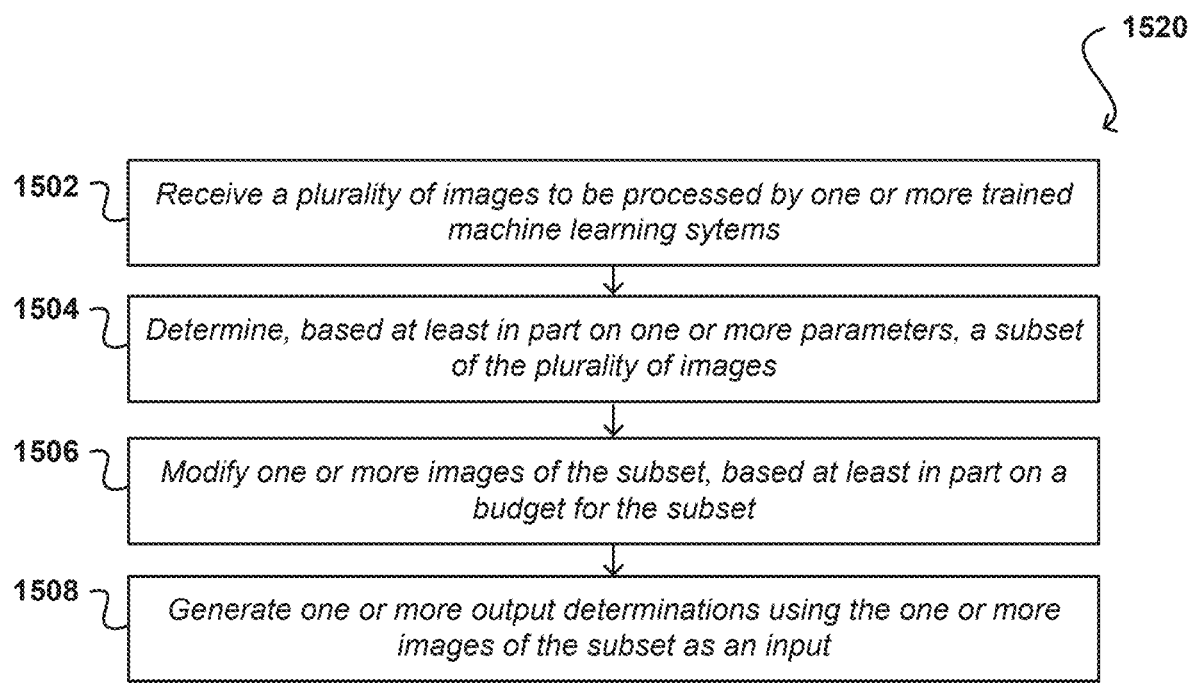
FIG. 15B is a flow chart of a process for model input data batching, in accordance with embodiments of the present disclosure.

FIG. 15B illustrates an example flow chart for a process 1520 for input data batching. In this example, a plurality of images are received for processing by one or more trained machine learning systems 1502. The plurality of images may be evaluated to select a subset of images 1504. The subset of images may be selected based on one or more properties, such as an image size, an image tag, and/or the like. In at least one embodiment, one or more images of the subset may be modified based on a budget for the subset 1506. For example, the budget may be associated with a maximum image size, and therefore, larger images may be resized to fit the maximum. Thereafter, one or more output determinations may be generated using the subset as an input.

Figure 16:
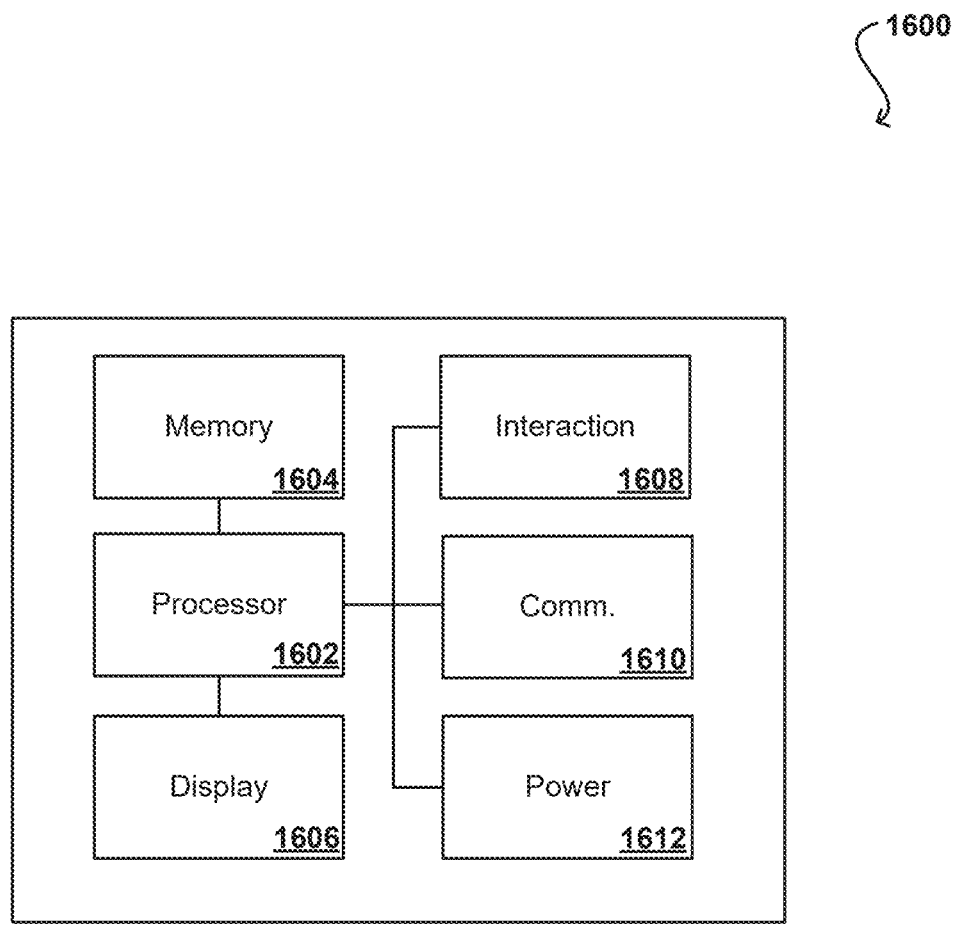
FIG. 16 is an example configuration for a computing device, in accordance with embodiments of the present disclosure.

FIG. 16 illustrates a set of general components of an example computing device 1600. In this example, the device includes a processor 1602 for executing instructions that can be stored in a memory 1604. The device can include many types of memory, data storage, or non-transitory computer-readable storage media, such as a first data storage for program instructions for execution by the processor 1602, a separate storage for images or data, a removable memory for sharing information with other devices, etc. The device may optionally include a display element 1606, such as a touch screen or liquid crystal display (LCD), although devices such as portable media players might convey information via other means, such as through audio speakers, and other devices may not include displays, such as server components executing within data centers, among other options. As discussed, the device in many embodiments will include at least one interaction component 1608 able to receive input from a user. This input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1600 of FIG. 16 can include one or more network interface or communication components 610 for communicating over various networks, such as a Wi-Fi, Bluetooth, RF, wired, or wireless communication systems. The device may be configured to communicate with a network, such as the Internet, and may be able to communicate with other such devices. The device will also include one or more power components 1612, such as power cords, power ports, batteries, wirelessly powered or rechargeable receivers, and the like.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Embodiments may also be described in view of the following clauses:

1. A computer-implemented method, comprising:
receiving image data to a first machine learning system;
determining, based at least in part on one or more features of the image data; pixel information associated with one or more dimensional properties of the image data;
extracting the pixel information for the image data;
generating one or more patches associated with the image data, the one or more patches collectively forming the image data;
generating one or more findings, using the first machine learning system, based at least in part on the one or more patches and the pixel information.

2. The computer-implemented method of clause 1, wherein the pixel information corresponds to at least one of a spatial dimension, a temporal dimension, or a clinical dimension of a pixel within a patch of the one or more matches.

3. The computer-implemented method of clause 1, wherein the one or more findings are based, at least in part, on a relationship between an area of interest in a first patch of the one or more patches and an adjacent patch determined using the pixel information.

4. The computer-implemented method of clause 1, further comprising:
providing, at inference, the pixel information.

5. The computer-implemented method of clause 1, wherein the pixel information is a vector associated with the one or more patches.

6. The computer-implemented method of clause 1, wherein the pixel information is determined using a second machine learning system.

7. The computer-implemented method of clause 1, wherein the pixel information is used to select one or more additional dimensional properties for the one or more patches.

8. A processor, comprising:
one or more circuits to:
receive image data to a first trained machine learning model;
determine, based at least in part on a size of a first portion of image data, a first portion budget;
select, from the remaining image data, one or more additional portions based, at least in part, on the first portion budget;
batch the first portion and the one or more additional portions into a group; and
generate one or more model determinations using the group as a model input.

9. The processor of clause 8, wherein the one or more additional portions have respective portions sizes less than or equal to the size.

10. The processor of clause 8, wherein the one or more circuits are further to:
determine a clinical indicator associated with the first portion of image date;
determine, from the remaining image data, one or more second portions with matching clinical indicators; and
add the one or more second portions to the group.

11. The processor of clause 8, wherein the one or more circuits are further to:
select a second portion of the second image data; and
determine a second portion budget based, at least in part, on a second size of the second image data.

12. The processor of clause 11, wherein the second size is greater than the first size.

13. The processor of clause 8, wherein the one or more circuits are further to:
determine pixel information for the first portion of image data; and
provide, at inference, the pixel information to generate the one or more model determinations.

14. The processor of clause 8, wherein an overall size of the group is less than the first portion budget.

15. A computer-implemented method, comprising:
receiving image data to a first trained machine learning model;
determining, based at least in part on a size of a first portion of image data, a first portion budget;
determining, based at least in part on one or more features of the first portion of image data, pixel information associated with a scale of the first portion of image data;
selecting, from the remaining image data, one or more additional portions based, at least in part, on the first portion budget;
batching the first portion and the one or more additional portions into a group; and
generating one or more model determinations using the group as a model input and the pixel information.

16. The computer-implemented method of clause 15, wherein the one or more additional portions have respective portions sizes less than or equal to the size.

17. The computer-implemented method of clause 15, wherein the pixel information corresponds to at least one of a spatial dimension, a temporal dimension, or a clinical dimension of a pixel.

18. The computer-implemented method of clause 15, further comprising:
determining a clinical indicator associated with the first portion of image date;
determining, from the remaining image data, one or more second portions with matching clinical indicators; and
adding the one or more second portions to the group.

19. The computer-implemented method of clause 15, further comprising:
selecting a second portion of the second image data; and
determining a second portion budget based, at least in part, on a second size of the second image data.

20. The computer-implemented method of clause 15, wherein an overall size of the group is less than the first portion budget.

21. A computer-implemented method, comprising:
receiving image data to a first machine learning system;
determining, based at least in part on one or more features of the image data; pixel information associated with one or more dimensional properties of the image data;
extracting the pixel information for the image data;
generating one or more patches associated with the image data, the one or more patches collectively forming the image data;
generating one or more findings, using the first machine learning system, based at least in part on the one or more patches and the pixel information.

22. The computer-implemented method of clause 21, wherein the pixel information corresponds to at least one of a spatial dimension, a temporal dimension, or a clinical dimension of a pixel within a patch of the one or more matches.

23. The computer-implemented method of any of clauses 21 or 22, wherein the one or more findings are based, at least in part, on a relationship between an area of interest in a first patch of the one or more patches and an adjacent patch determined using the pixel information.

24. The computer-implemented method of any of clauses 21-23, further comprising:
providing, at inference, the pixel information.

25. The computer-implemented method of any of clauses 21-24, wherein the pixel information is a vector associated with the one or more patches.

26. The computer-implemented method of any of clauses 21-25, wherein the pixel information is determined using a second machine learning system.

27. The computer-implemented method of any of clauses 21-26, wherein the pixel information is used to select one or more additional dimensional properties for the one or more patches.

28. A processor, comprising:
one or more circuits to:
receive image data to a first trained machine learning model;
determine, based at least in part on a size of a first portion of image data, a first portion budget;
select, from the remaining image data, one or more additional portions based, at least in part, on the first portion budget;
batch the first portion and the one or more additional portions into a group; and
generate one or more model determinations using the group as a model input.

29. The processor of clause 28, wherein the one or more additional portions have respective portions sizes less than or equal to the size.

30. The processor of any of clauses 28 or 29, wherein the one or more circuits are further to:
determine a clinical indicator associated with the first portion of image date;
determine, from the remaining image data, one or more second portions with matching clinical indicators; and
add the one or more second portions to the group.

31. The processor of any of clauses 28-30, wherein the one or more circuits are further to:
select a second portion of the second image data; and
determine a second portion budget based, at least in part, on a second size of the second image data.

32. The processor of clause 31, wherein the second size is greater than the first size.

33. The processor of any of clauses 28-32, wherein the one or more circuits are further to:
determine pixel information for the first portion of image data; and
provide, at inference, the pixel information to generate the one or more model determinations.

34. The processor of any of clauses 28-33, wherein an overall size of the group is less than the first portion budget.

35. A computer-implemented method, comprising:
receiving image data to a first trained machine learning model;
determining, based at least in part on a size of a first portion of image data, a first portion budget;
determining, based at least in part on one or more features of the first portion of image data, pixel information associated with a scale of the first portion of image data;
selecting, from the remaining image data, one or more additional portions based, at least in part, on the first portion budget;

batching the first portion and the one or more additional portions into a group; and generating one or more model determinations using the group as a model input and the pixel information.

36. The computer-implemented method of clause 35, wherein the one or more additional portions have respective portions sizes less than or equal to the size.

37. The computer-implemented method of any of clauses 35 or 36, wherein the pixel information corresponds to at least one of a spatial dimension, a temporal dimension, or a clinical dimension of a pixel.

38. The computer-implemented method of any of clauses 35-37, further comprising:

determining a clinical indicator associated with the first portion of image date;

determining, from the remaining image data, one or more second portions with matching clinical indicators; and adding the one or more second portions to the group.

39. The computer-implemented method of any of clauses 35-38, further comprising:

selecting a second portion of the second image data; and determining a second portion budget based, at least in part, on a second size of the second image data.

40. The computer-implemented method of any of clauses 35-39, wherein an overall size of the group is less than the first portion budget.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A processor, comprising:
   one or more circuits to:
   receive image data to a first trained machine learning model;
   determine, based at least in part on a size of a first portion of image data, a first portion budget;
   select, from remaining image data corresponding to one or more additional images, one or more additional portions based, at least in part, on the first portion budget;
   batch the first portion and the one or more additional portions into a group, wherein each of the first portion of image data and the remaining image data collectively have a group budget less than the first portion budget; and
   generate one or more model determinations using the group as a model input.

2. The processor of claim 1, wherein the one or more additional portions have respective portion sizes less than or equal to the size of the first portion of image data.

3. The processor of claim 1, wherein the one or more circuits are further configured to:
   determine a clinical indicator associated with the first portion of image data;
   determine, from the remaining image data, one or more second portions with matching clinical indicators; and
   add the one or more second portions to the group.

4. The processor of claim 1, wherein the one or more circuits are further configured to:
   select a second portion of second image data; and
   determine a second portion budget based, at least in part, on a second size of the second image data.

5. The processor of claim 4, wherein the second size is greater than the first size.

6. The processor of claim 1, wherein the one or more circuits are further configured to:
   determine pixel information for the first portion of image data; and
   provide, at inference, the pixel information to generate the one or more model determinations.

7. The processor of claim 1, wherein the one or more additional portions are selected based, at least in part, on a pixel-based scale.

8. A computer-implemented method, comprising:
   receiving image data to a first trained machine learning model;
   determining, based at least in part on a size of a first portion of image data, a first portion budget;
   determining, based at least in part on one or more features of the first portion of image data, pixel information associated with a scale of the first portion of image data;
   selecting, from remaining image data, one or more additional portions based, at least in part, on the first portion budget;
   batching the first portion and the one or more additional portions into a group, wherein each of the first portion of image data and the remaining image data collectively have a group budget less than the first portion budget; and
   generating one or more model determinations using at least one of the group or of the pixel information as a model input.

9. The computer-implemented method of claim 8, wherein the one or more additional portions have respective portion sizes less than or equal to the size of the first portion of image data.

10. The computer-implemented method of claim 8, wherein the pixel information corresponds to at least one of a spatial dimension, a temporal dimension, or a clinical dimension of a pixel.

11. The computer-implemented method of claim 8, further comprising:
    determining a clinical indicator associated with the first portion of image data;
    determining, from the remaining image data, one or more second portions with matching clinical indicators; and
    adding the one or more second portions to the group.

12. The computer-implemented method of claim 8, further comprising:
    selecting a second portion of second image data; and
    determining a second portion budget based, at least in part, on a second size of the second image data.

13. The computer-implemented method of claim 8, wherein the one or more additional portions are selected based, at least in part, on a pixel-based scale.

* * * * *